United States Patent [19]
Tran et al.

[11] Patent Number: 5,701,411
[45] Date of Patent: Dec. 23, 1997

[54] AUTOMATIC DETECTION OF NETWORK HARDWARE CONNECTION

[75] Inventors: Duc Tran, Long Beach; Robert D. Wadsworth, Costa Mesa; Tony K. Ip, Trabuco Canyon; William C. Russell, Laguna Hills, all of Calif.

[73] Assignee: Canon Information Systems, Inc., Costa Mesa, Calif.

[21] Appl. No.: 336,662

[22] Filed: Nov. 4, 1994

[51] Int. Cl.$^6$ .................................................... G06F 11/20
[52] U.S. Cl. ............................... 395/200.1; 395/200.2; 395/828
[58] Field of Search ........................... 395/828, 824, 395/835, 200.02, 200.2, 821, 200.1; 370/13, 10

[56] References Cited

U.S. PATENT DOCUMENTS

| | | | |
|---|---|---|---|
| 3,990,024 | 11/1976 | Hou | 333/33 |
| 5,142,269 | 8/1992 | Mueller | 340/568 |
| 5,319,785 | 6/1994 | Thaller | 395/725 |
| 5,406,260 | 4/1995 | Cummings et al. | 340/568 |
| 5,410,535 | 4/1995 | Yang et al. | 370/13 |
| 5,444,856 | 8/1995 | Bowers et al. | 395/200.1 |
| 5,513,370 | 4/1996 | Paul | 395/800 |

FOREIGN PATENT DOCUMENTS

| | | |
|---|---|---|
| 598513 | 5/1994 | European Pat. Off. . |
| 2-294757 | 12/1990 | Japan . |

Primary Examiner—Jack B. Harvey
Assistant Examiner—Paul R. Myers
Attorney, Agent, or Firm—Fitzpatrick, Cella, Harper & Scinto

[57] ABSTRACT

A network communication device has plural different connectors, each connectable to a network, and is capable of automatically selecting between the different connectors for network communication. A selector responsive to a selection signal selects one of the plural connectors, and a plurality of detectors, each associated with a corresponding connector, detects whether its corresponding connector is connected to the network. A processor executes a selection process by outputting a selection signal so as to select, in turn, each of the plural different connectors starting with a first connector, maintaining the state of the selection signal in a case where the detector associated with the selected connector indicates connection to the network, cycling to the next connector in a case where the detector does not indicate connection to the network, and repeating the selection process in a case where said processor has cycled through all of said plural connectors.

21 Claims, 29 Drawing Sheets

AUTOMATIC DETECTION OF NETWORK HARDWARE CONNECTION

BACKGROUND OF THE INVENTION

FIELD OF THE INVENTION

The present invention concerns a network communication device which has multiple network connectors, and which can automatically detect which connector is connected to the network. More particularly, the present invention concerns a network communication device which senses which of multiple connectors is connected to the network, and transfers network communications to and from the network through that connector.

INCORPORATION BY REFERENCE

U.S. Pat. Serial No. 5,611,046, entitled "Method And Apparatus For Interfacing A Peripheral To A Local Area Network", is hereby incorporated by reference.

DESCRIPTION OF THE RELATED ART

Network communication devices generally provide several different types of physical connections for connecting network cables to a LAN. For example, a BNC connector may be provided for connection to a 10Base-2 coaxial cable, while an RJ-45 connector may be provided for connection to 10Base-T unshielded twisted pair (UTP) wire. Other physical connections, such as an IBM data connector for a shielded twisted pair (STP) wire or an ST fiber optic connector for a fiber optic cable, are also possible.

Typically, when a network communication device is connected to a LAN through one of its several connectors, an individual establishing or changing the connection with the LAN must not only insert the cable in the proper connector, but must also physically change the position of a hard switch, or "jumper", so that data is routed to and from the proper connector.

Due to human error, however, it is possible for the individual to forget to change the jumper, or to put the jumper in an improper state with respect to the connection that has been established. If the jumper is in the wrong state, of course, the network communication device will be unable to communicate with the network, since it will be sending data to, and attempting to retrieve data from, an open connector. A user trying to use the device would then telephone a service person, who would come to the location, spend time isolating the problem, and finally change the jumper to its proper state. This results in an unacceptable waste of time, manpower and computer resources.

SUMMARY OF THE INVENTION

The present invention overcomes these difficulties by providing a network communication device which automatically senses which connector has been connected to the LAN, and then routes data to and from that connector.

In one aspect of the present invention, a network communication device having plural different connectors, each connectable to a network, includes a selector, responsive to a selection signal, which selects one of the plural connectors in accordance with the selection signal. A plurality of detectors, each associated with a corresponding connector, detect whether the corresponding connector is connected to the network. A processor executes a selection process by outputting a selection signal so as to select, in turn, each of the plural connectors, starting with a first connector, maintaining the state of the selection signal in a case where the detector associated with the selected connector indicates connection to the network, cycling to a next connector in a case where the detector does not indicate connection to the network, and repeating the selection process in a case where the processor has cycled through all of the connectors.

In a preferred embodiment of the present invention, an RJ-45 connector and a BNC connector are coupled to a network controller. The network controller includes a selector, responsive to a selection signal, which selects between the two connectors, so that network communications can be transferred between the selected connector and a processor. The network controller includes a first detector which detects whether the RJ-45 connector is electrically connected to the network, and a register, which the processor can read, which stores a "jabber" bit which indicates that the BNC connector is improperly terminated. A second register, which the processor can also read, stores a "good-link" bit which indicates that the first detector has detected that the RJ-45 connector is electrically connected to the network. A control register, to which the processor can write, stores a select bit. The control register outputs the selection signal in accordance with the select bit stored therein.

The processor executes a selection process by 1) writing a select bit to the control register so as to cause output of a selection signal which selects the RJ-45 connector, 2) reading the good-link bit from the second register, 3) maintaining the state of the selection bit when the good-link bit indicates electrical connection to the network, 4) writing a select bit to the control register so as to cause output of a selection signal which selects the BNC connector when the good-link bit does not indicate electrical connection to the network, 5) reading the jabber bit from the first register, 6) maintaining the state of the select bit when the jabber bit does not indicate improper electrical termination of the second connector, and 7) repeating the selection process when the jabber bit indicates improper electrical termination of the second connector.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

In its most preferred form, the present invention is embodied in a network board (or "NEB") which provides hardware, software and firmware solutions for making a network peripheral, such as a printer, an intelligent, interactive network member, capable not only of receiving and processing data from the network, but also of transmitting to the network significant amounts of data about the peripheral such as detailed status information, operational parameters and the like. It is also possible to use the invention in other networked peripherals such as scanning, facsimile, copier, image processing and other such peripherals. Integration of such hardware, software and firmware with the peripheral eliminates the need to dedicate a personal computer to act as a peripheral server.

[Network Architecture]

Figure 1:
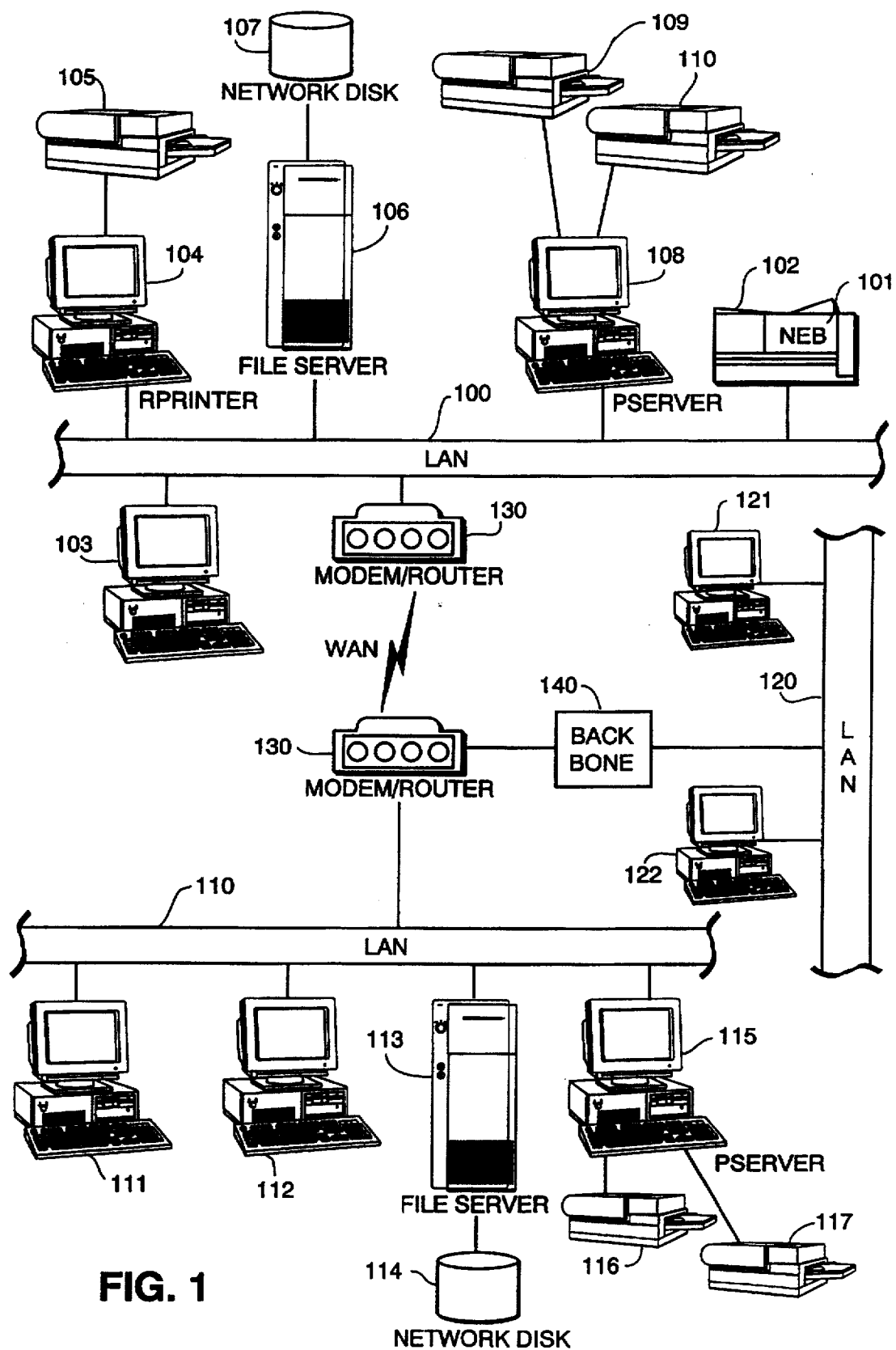
FIG. 1 is a diagram of a local area network and wide area network to which a network board is coupled.

FIG. 1 is a diagram showing the present invention incorporated into a NEtwork Board (NEB) 101 coupled to a printer 102 having an open architecture. NEB 101 is coupled to local area network (LAN) 100 through a LAN interface, for example, an Ethernet interface 10Base-2 with a Coax connector or 10Base-T with an RJ-45 connector.

Plural personal computers (PCs), such as PCs 103 and 104, are also connected to LAN 100, and under control of the network operating system these PCs are able to communicate with NEB 101. One of the PCs, such as PC 103, may be designated for use as the network administrator. A PC may have a printer connected to it, such as printer 105 connected to PC 104.

Also connected to LAN 100 is file server 106 which manages access to files stored on a large capacity (e.g., 10 gigabyte) network disk 107. A print server 108 provides print services to printers 109 and 110 connected to it, as well as to remote printers such as printer 105. Other unshown peripherals may also be connected to LAN 100.

In more detail, the network depicted in FIG. 1 may utilize any network software such as Novell or UNIX software in order to effect communication among the various network members. The present embodiments will be described with respect to a LAN utilizing Novell NetWare® software, although any network software could be used. A detailed description of this software package may be found in "NetWare® User's Guide" and "NetWare® Supervisor's Guide", published by M&T Books, copyrighted 1990, incorporated herein by reference. See also the "NetWare® Printer Server" by Novell, March 1991 edition, Novell Part No. 100-000892-001.

Briefly, file server 106 acts as a file manager, receiving, storing, queuing, caching, and transmitting files of data between LAN members. For example, data files created respectively at PCs 103 and 104 may be routed to file server 106 which may order those data files and then transfer the ordered data files to printer 109 upon command from print server 108.

PCs 103 and 104 may each comprise a standard PC capable of generating data files, transmitting them onto LAN 100, receiving files from LAN 100, and displaying and/or processing such files. However, while personal computer equipment is illustrated in FIG. 1, other computer equipment may also be included, as appropriate to the network software being executed. For example, UNIX workstations may be included in the network when UNIX software is used, and those workstations may be used in conjunction with the illustrated PC's under appropriate circumstances.

Typically, a LAN such as LAN 100 services a fairly localized group of users such as a group of users on one floor or contiguous floors in a building. As users become more remote from one another, for example, in different buildings or different states, a wide area network (WAN) may be created which is essentially a collection of several LANs all connected by high speed digital lines, such as high speed integrated services digital network (ISDN) telephone lines. Thus, as shown in FIG. 1, LANs 100, 110 and 120 are connected to form a WAN via modulator/demodulator (MODEM)/transponder 130 and backbone 140, which is simply an electrical connection between several buses. Each LAN includes its own PCs, and each ordinarily includes its own file server and print server, although that is not necessarily the case.

Thus, as shown in FIG. 1, LAN 110 includes PCs 111 and 112, file server 113, network disk 114, print server 115 and printers 116 and 117. LAN 120, on the other hand, includes only PCs 121 and 122. Via WAN connections, equipment in any of LANs 100, 110 and 120 can access the capabilities of equipment in any other of the LANs.

PC 104 may be embedded with an RPRINTER software program, and as such may exert limited control over network peripherals. The RPRINTER program is an MS-DOS terminate-and-stay-resident ("TSR") program which allows users to share printer 105 connected to PC 104 while at the same time allowing PC 104 to execute other non-print applications. RPRINTER is a relatively unintelligent program that does not have the ability to search printer queues for work. RPRINTER gets its work from print server 108 running elsewhere in the network. Because it communicates with the attached printer over the printer's parallel port, PC 104 running RPRINTER is able to obtain only limited status information from printer 105 and to return that status information to print server 108 over LAN 100. From a control standpoint, RPRINTER allows stopping of a print job (when, for example, the printer is out of paper or off-line) and little more. Some printers include RPRINTER features by offering internal or external circuit boards that provide the same limited features of the RPRINTER TSR program running in a personal computer.

Print server 108 is capable of exercising more significant control over LAN peripherals but requires a dedicated PC which cannot be used for any other task. Print server 108, which may itself be a PC, has the ability to service multiple user-defined print queues, perform dynamic search queue modification, and provide defined notification procedures for exception (failure) conditions and status and control capabilities, and can control both local printers 109 and 110 (that is, printers physically connected to print server 108) and remote printers. Local printers 109 and 110 can be connected to either serial or parallel ports, and the remote printers, such as printer 105, are printers running elsewhere in the system which print server 108 controls through RPRINTER software.

Print server 108 can control many local or remote printers and can request print information from many file server queues. However, there are several drawbacks to relying on print server 108 to control network printing services. A first drawback is that multiple printer streams must all be funnelled through a single network node. This can become a bottleneck. A second drawback is that for the most efficient operation, the printers should be connected to the print server locally, like printers 109 and 110. This can be an inconvenience for users since it requires the printers to be clustered around print server 108 and also requires users to travel to those clustered printers. A third drawback is that if the controlled printers are remote, as in the case of printer 105 which is serviced by RPRINTER, then print data must make several trips, first from file server 106 to print server 108, and then from print server 108 to the printer running RPRINTER. This is inefficient.

A fourth drawback is the limited amount of printer status and control information offered through print server 108. It has already been stated that RPRINTER does not allow for much more than rudimentary status information such as "out of paper" and "off line". Print server 108 does not offer more than this because it was designed with consideration of the limitations of the personal computer parallel port.

[The Network Board]

Installation of NEB 101 into printer 102 provides many advantages over the network peripheral control entities discussed above, in that it allows printer 102 to become an intelligent, interactive network member.

Figure 2:
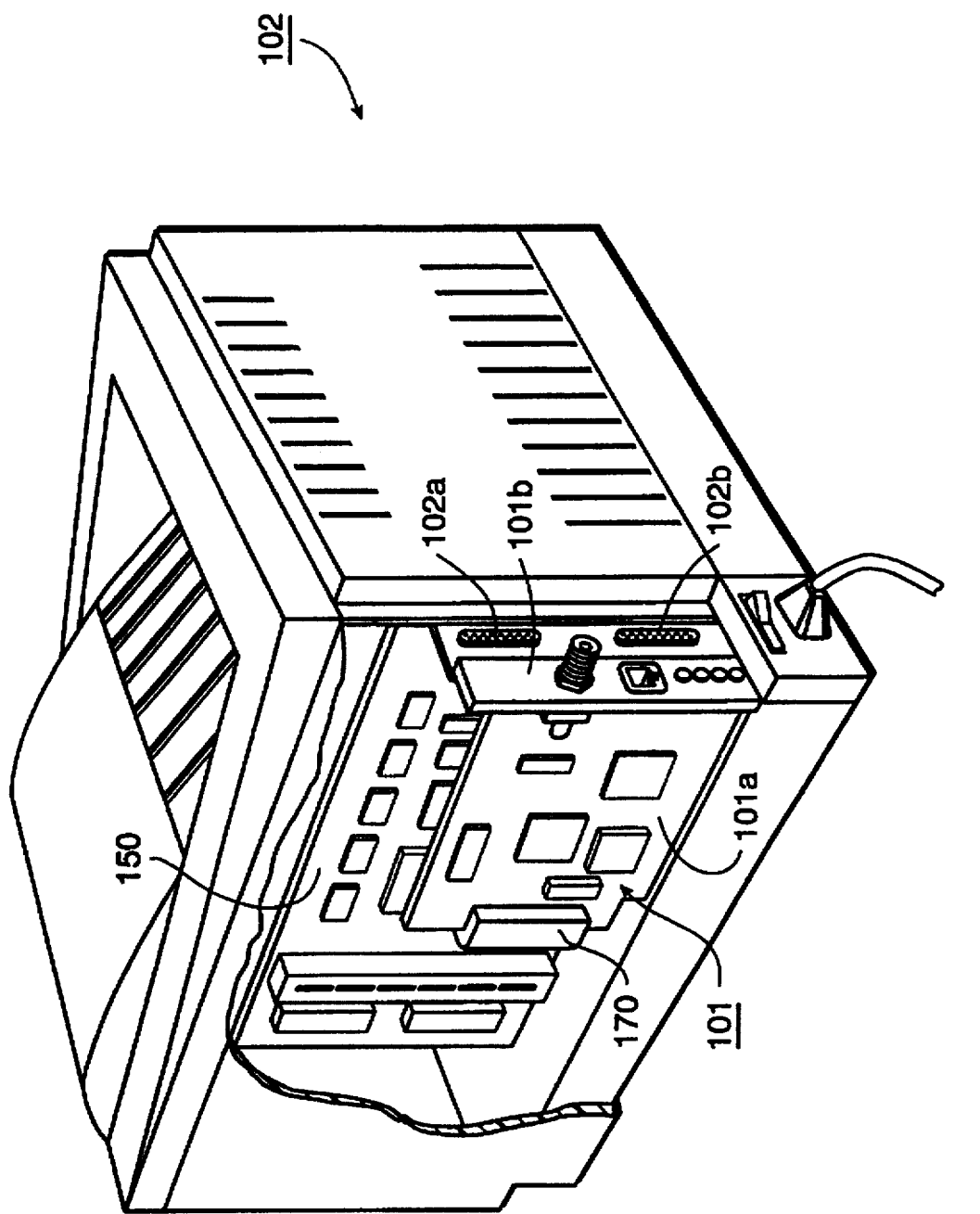
FIG. 2 is a cut-away perspective view of the network board fitted into a Canon LBP 1260 laser printer.

As shown in FIG. 2, NEB 101 is preferably housed in an internal expansion I/O slot of printer 102, which in a preferred embodiment of the present invention is a Canon LBP 1260 laser printer. This makes NEB 101 an embedded network node having the processing and data storage features described below.

The architecture of NEB 101 provides an advantage in that it has unique support features for administration and management of large, multi-area WAN networks. These support features could include, for example, printer control and status monitoring from a remote location on the network (such as from the network administrator's office), automatic management of printer configuration after each print job to provide a guaranteed initial environment for a next user, and printer logs or usage statistics accessible across the network for characterizing printer workload and scheduling toner cartridge replacement.

An important parameter in the NEB design is the ability to access the printer control state from NEB 101 through a bi-directional interface, here a shared memory, although other bi-directional interfaces such as SCSI interfaces are also possible. This allows printer console information to be exported to NEB 101 or to an external network node so as to allow programming of many useful support functions. Blocks of print image data and control information are assembled by a microprocessor on board NEB 101, they are written into the shared memory, and they are then read by printer 102. Likewise, printer status information is transferred from printer 102 to the shared memory, from where it is read by the NEB microprocessor.

FIG. 2 is a cut-away perspective view showing installation of NEB 101 into printer 102. As seen in FIG. 2, NEB 101, which is constructed from a printed circuit board 101a on which is mounted face plate 101b which allows for network connections, is connected via connector 170 to printer interface card 150. As described below, printer interface card 150 directly controls the print engine in printer 102. Print data and printer status commands are fed to printer interface card 150 from NEB 101 via connector 170, and printer status information is obtained from card 150 also via connector 170. NEB 101 communicates this information onto LAN 100 via the network connectors on face plate 101b. At the same time, printer 102 can also receive print data from conventional serial port 102a and parallel port 102b.

Figure 3:
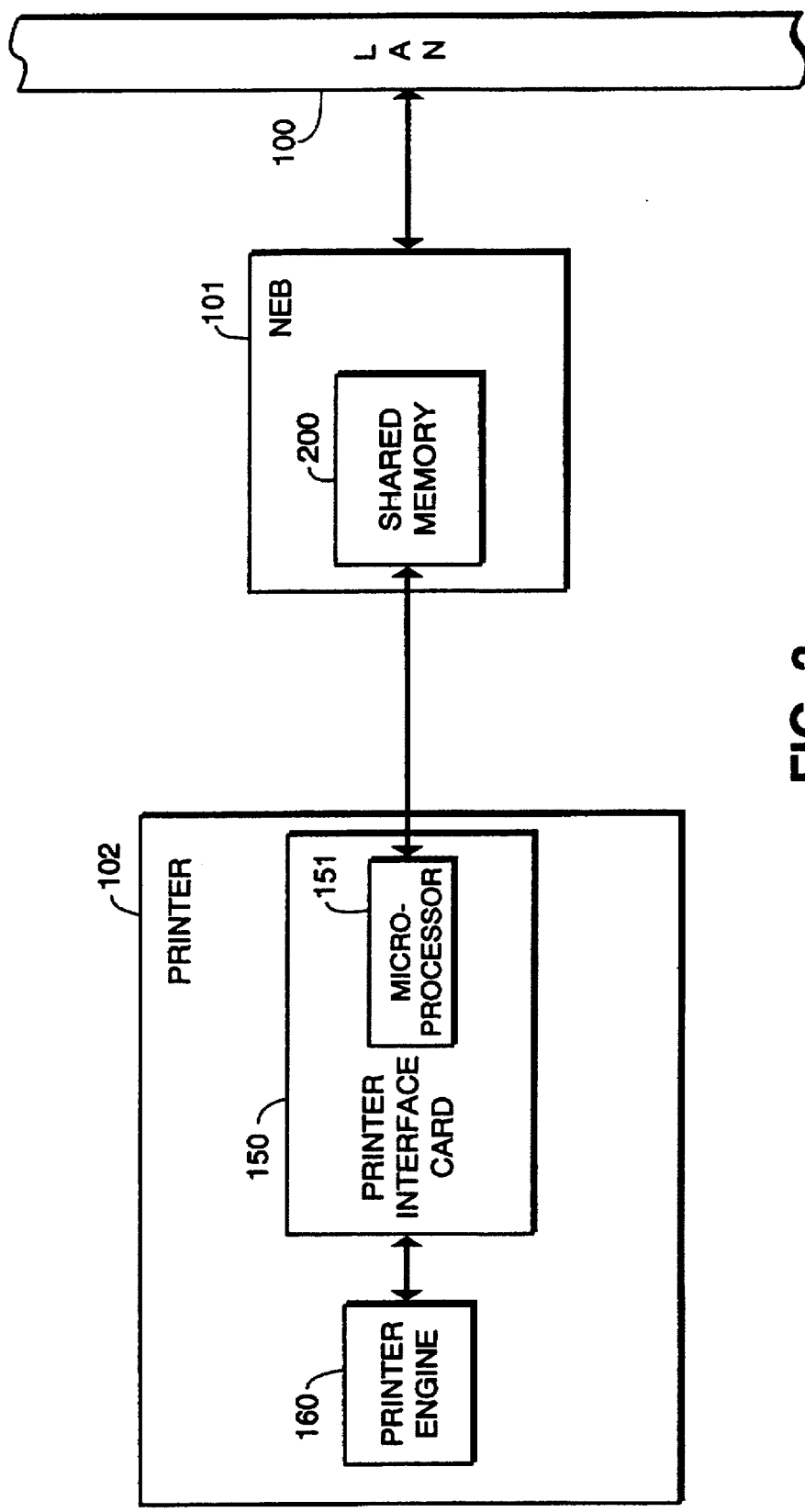
FIG. 3 is a block diagram showing the network board coupled between a printer and a local area network.

FIG. 3 is a block diagram depicting electrical connection of NEB 101 to printer 102. NEB 101 is directly connected to LAN 100 via a LAN interface, and to printer 102 via printer interface card 150. In a preferred embodiment of the invention, the printer interface card 150 is a Peerless LBP-860/1260-External Standard I/O Board Interface, available from Peerless Systems Corp., the details of which can be found in the Peerless Standard I/O Interface Design Specification, revision 2.07a, Peerless Systems Corp., May 10, 1994. The board includes an Intel 80960KB-20 microprocessor 151. Although it is a 32-bit machine, microprocessor 151 accesses data to and from NEB 101 are in 2 byte wide (16-bit) transfers via a shared memory 200 arranged on NEB 101. Microprocessor 151 also communicates with print engine 160 which actually drives the printing mechanism.

[NEB Physical Layout]

Figure 4:
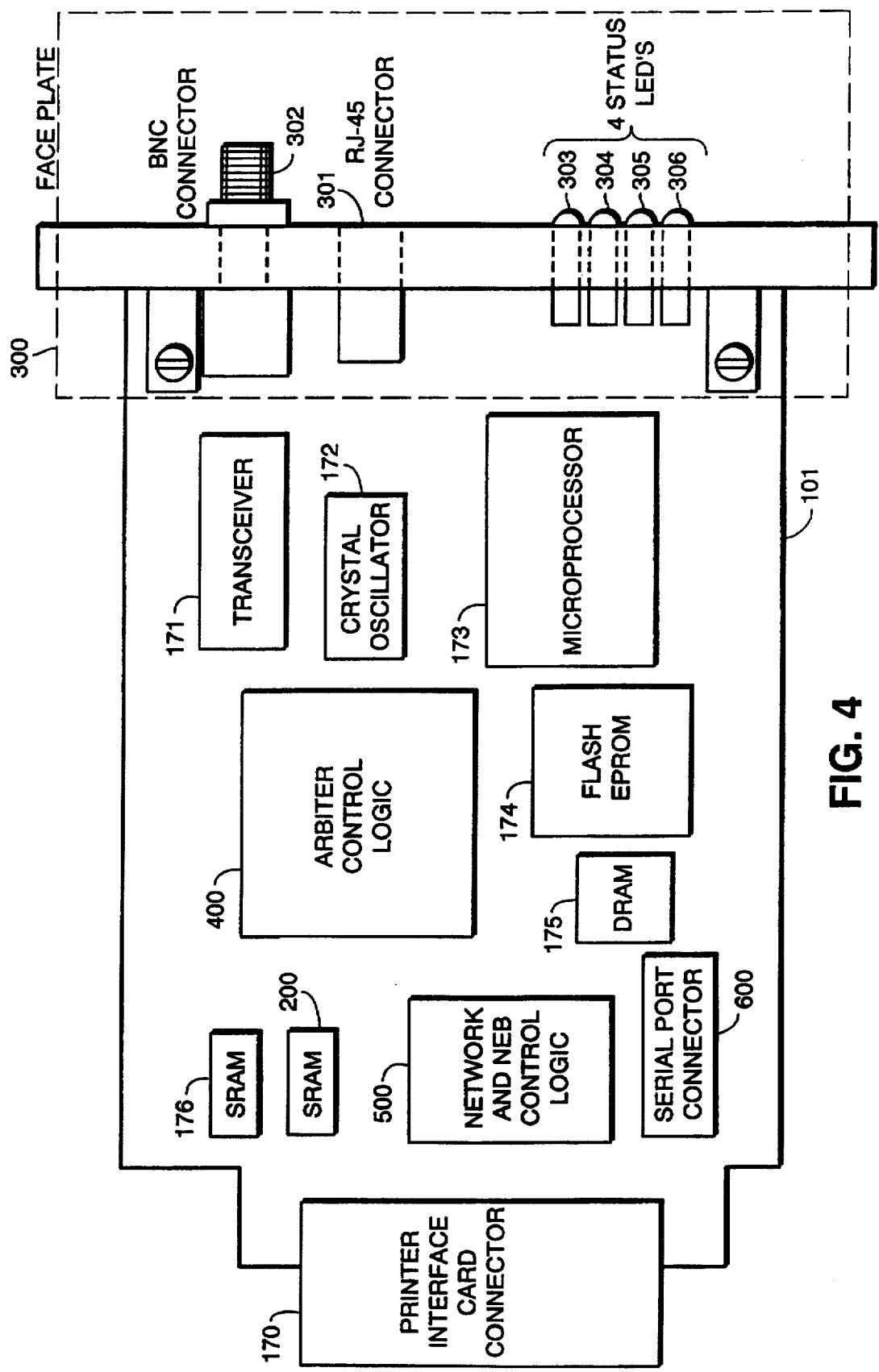
FIG. 4 is a diagram showing the physical layout of components on the network board.

FIG. 4 shows the dimensions of a preferred embodiment of NEB 101 and the physical layout of the major components thereof. The NEB card is 3.93 inches by 5.60 inches. NEB 101 includes a printer interface card connector 170 (which in the case of the Peerless printer interface card is an 80-pin connector) that couples to the printer interface card and face plate 300 having connectors 301 and 302 that allow connection to LAN 100. The face plate also includes 4 status light emitting diodes (LEDs) 303–306. Arranged on the NEB card are transceiver 171, crystal oscillator 172, microprocessor 173, arbiter control logic 400, flash erasable programmable read only memory (EPROM) 174, dynamic random access memory (DRAM) 175, first static random access memory (SRAM) 200, second SRAM 176, network and NEB control logic 500, and serial port connector 600. Each of these components will be discussed in greater detail below.

Figure 5:
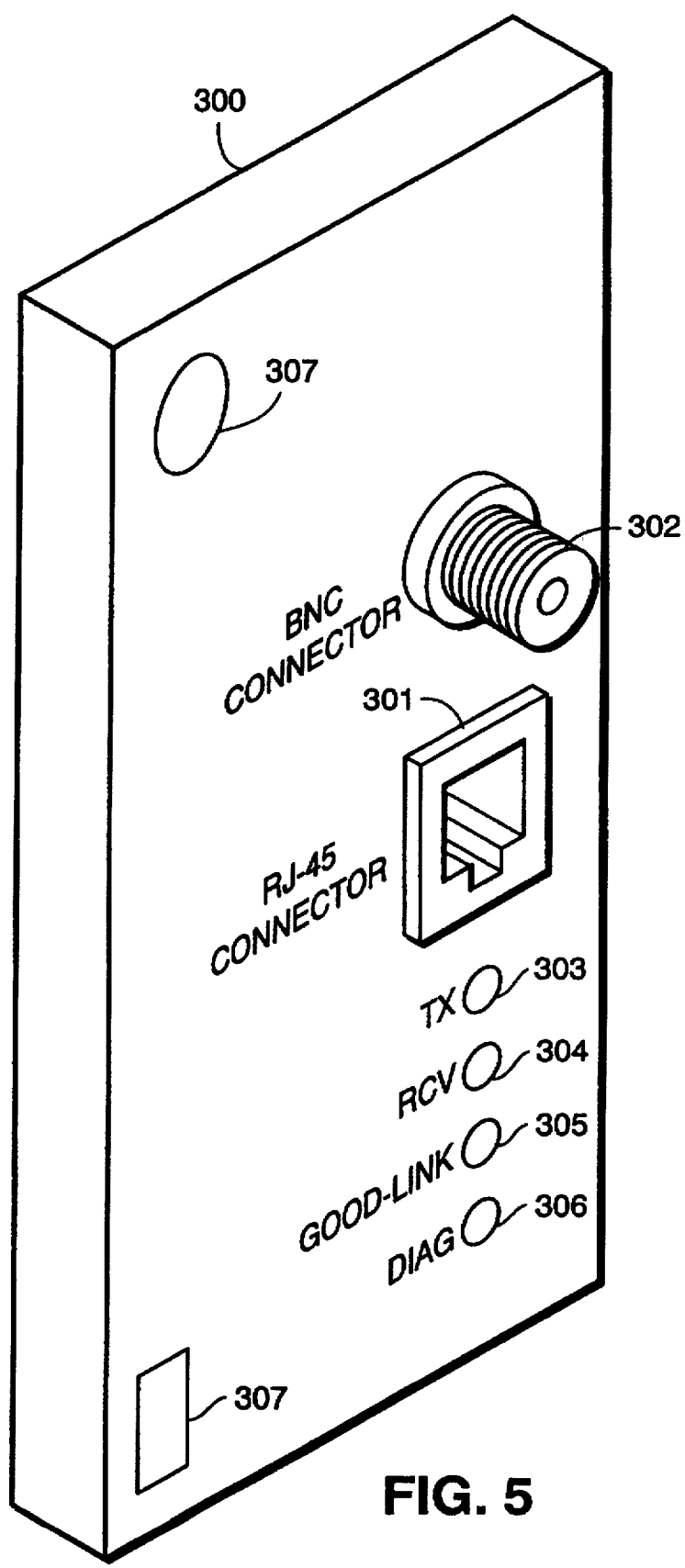
FIG. 5 is a drawing of a face plate for the network board.

FIG. 5 depicts a more detailed view of face plate 300, the dimensions of which are 4.56 inches by 1.28 inches. As stated above, NEB 101 couples to LAN 100 through connectors 301 and 302. Preferably, connector 301 is an RJ-45 connector capable of accepting a 10Base-T connection, while connector 302 may be a simple coax connector capable of accepting a 10Base-2 connection. Status LED 303 is lit when NEB 101 is transmitting data over LAN 100, and status LED 304 is lit when NEB 101 is receiving data from LAN 100. Status LED 305 is lit when RJ-45 connector 301 is connected to LAN 100, while status LED 306 is lit during self-test diagnostics of NEB 101. Mounting holes 307 accept crews for fixing NEB 101 to printer 102.

[NEB Architecture]

Figure 6:
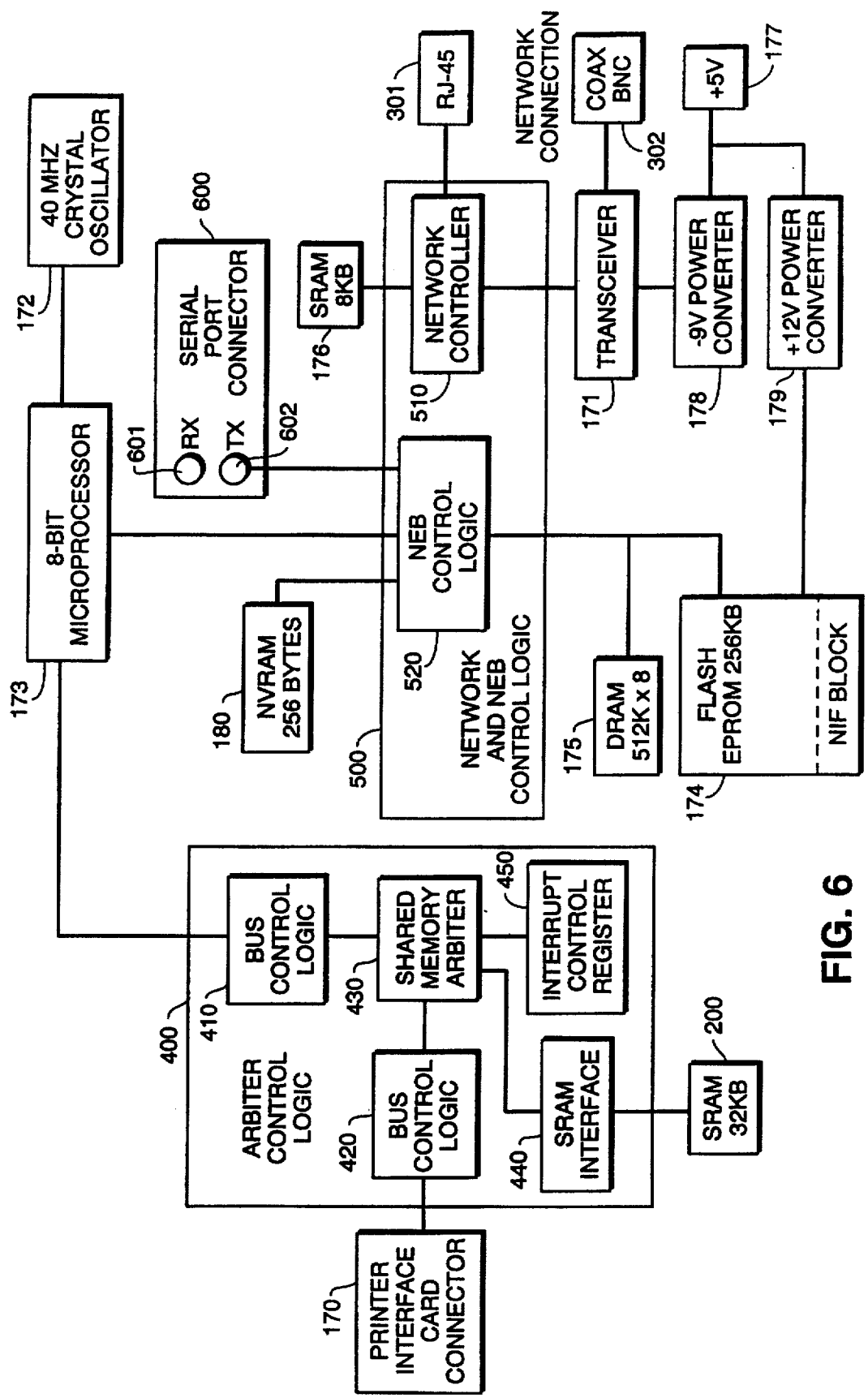
FIG. 6 is a functional block diagram of the network board.

The architecture of NEB 101 is shown in FIG. 6. Power for all circuits is supplied to NEB 101 from a +5V power source 177. +5V power is also provided to power converters 178 and 179. Power converter 178 provides −9V power to transceiver 171, while power converter 179 provides +12V power to flash EPROM 174 for "flashing" (i.e., reprogramming of the EPROM).

Network and NEB control logic 500 is preferably a single 144-pin application specific integrated circuit (ASIC) that includes a network controller 510 and NEB control logic 520. Network controller 510 is an NCR macro-cell compatible with National DP83902A "ST-NIC" Ethernet controller, the details of which can be found in National Semiconductor's *Local Area Networks Databook*, National Semiconductor p/n 400055, National Semiconductor, 1993. Network controller 510 is designed to interface with CSMA/CA-type (carrier sense multiple access with collision detection) local area networks.

Network controller 510 connects with RJ-45 connector 301 directly and with coaxial connector 302 through transceiver 171, which is preferably a National Semiconductor DP8392 coaxial transceiver interface, the details of which can also be found in National's *Local Area Networks Databook*. Network controller 510 is also coupled to an 8KB SRAM 176 that is used as an input/output packet buffer for Ethernet data. This memory should preferably have an access time of about 70 ns or less.

NEB control logic 520 provides an interface between network controller 510, microprocessor 173, and memory devices EPROM 174 and DRAM 175. NEB control logic 520 also interfaces with non-volatile random access memory (NVRAM) 180, which is a 256 byte serial electrically erasable/programmable memory used for initialization data storage during power cycling of printer 102 which houses NEB 101. Network and printer configuration parameters are written into NVRAM 180 when the printer is first installed onto the network to allow NEB software to recover the installation parameters after printer power has been cycled off and on.

NEB control logic 520 also couples with serial port connector 600, which comprises a receive data pin 601 and a transmit data pin 602 that can respectively receive and transmit serial data streams for debugging purposes. NEB control logic 520 senses data present at the receive data line and samples the serial bits at regular intervals, in a manner that will be discussed in greater detail below.

The central controller of NEB 101 is microprocessor 173, preferably an Intel 80C188EA-20 8-bit processor, the details of which can be found in the 80C186EA/80188EA User's Manual, Intel p/n 270950-001, Intel Corp. This processor is an 8-bit processor with direct memory access (DMA), interrupts, timers, and a DRAM refresh control. Other microprocessors, such as an AMD 80C188-20 8-bit microprocessor, might alternatively be used. 256 KB flash EPROM 174 and 512 KB DRAM 175 are coupled to microprocessor 173 via NEB control logic 520, while 32 KB SRAM 200 (which is shared with printer interface card 150) is coupled with microprocessor 173 via arbiter control logic 400. A 40 MHz, 50 ppm crystal oscillator 172 provides the microprocessor with a clock signal that is wholly separate from and asynchronous with the clock signal provided to microprocessor 151 on printer interface card 150.

Microprocessor 173 executes instructions in flash EPROM 174, which stores control firmware and printing application software. After power-on self-test (POST), code is selectively moved to the higher performance 512 KB DRAM 175, which should preferably have an access time of about 80 ns, for actual execution. Flash EPROM 174 can be reprogrammed, or "flashed", from LAN 100, as discussed below.

Figure 7:
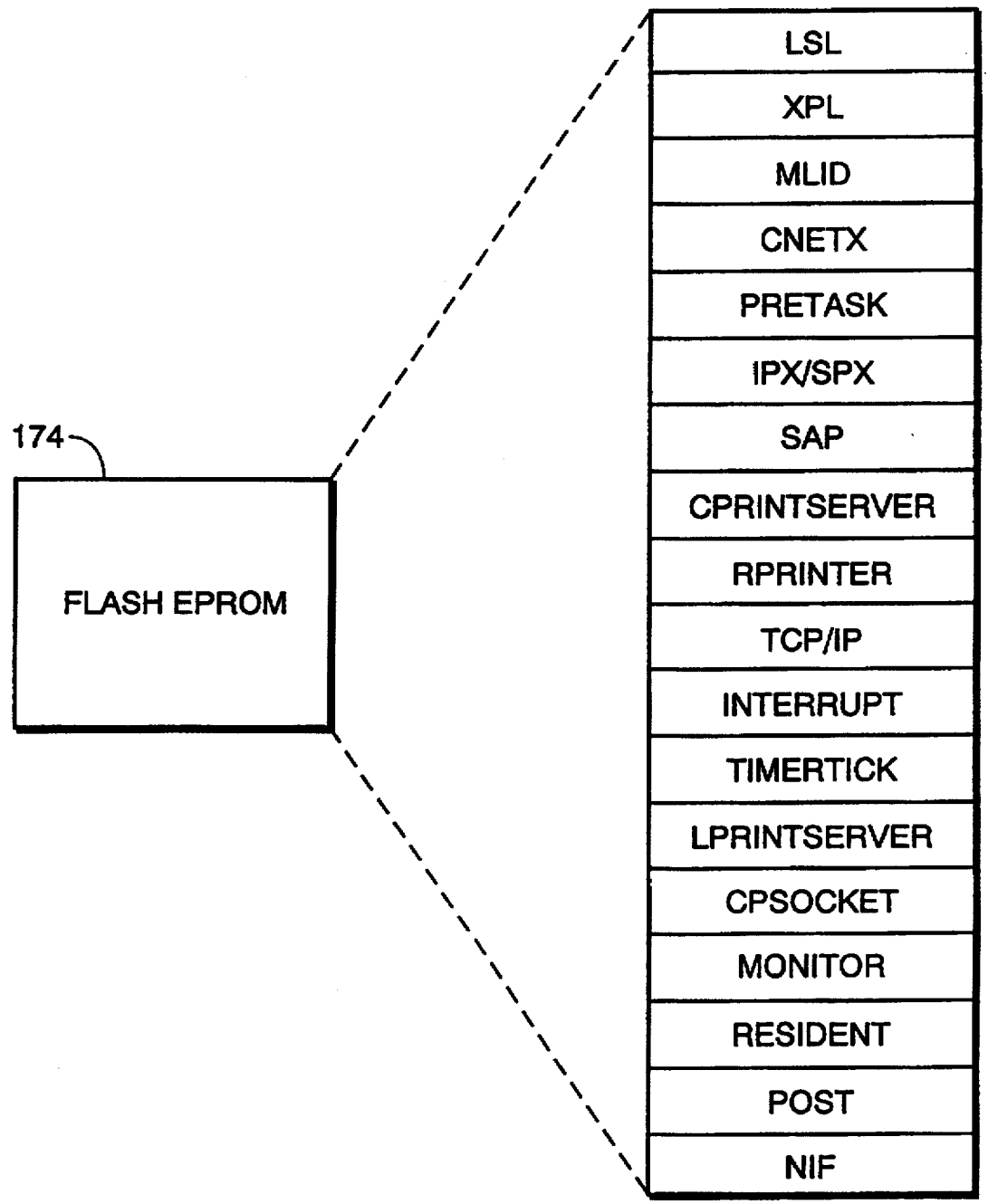
FIG. 7 is a diagram showing examples of several software modules that may be stored in the flash EPROM.

FIG. 7 illustrates several examples of blocks of code, or modules, that are stored in flash EPROM 174. The XPL module provides a standardized interface between printer 102 and NEB 101. MLID (Multi Link Interface Driver) is a piece of Novell code (Media Support Module, or MSM) linked together with a piece of customized code (Hardware Support Module, or HSM) that is the lowest level of network connection, while LSL (Link Support Layer) is a piece of Novell code that acts as a multiplexer between the low level MLID and the several protocol stacks above it. CNETX is customized code that turns local DOS-like function calls into network function calls, providing file functions like OPEN, READ, WRITE and CLOSE.

The PRETASK module is responsible for identifying what frame types are associated with the various possible protocol stacks, as described below. Because NEB 101 supports multiple protocol stacks, this module exists as long as NEB 101 is running.

Novell's IPX/SPX protocol stack is contained in flash EPROM 174, and is supported by SAP, or Service Advertising Protocol. SAP is a Novell concept that allows devices to register themselves into the file server's bindery, which lists active and inactive network entities. Because print servers are a special kind of bindery item, SAP registers NEB 101 via CPSOCKET, and if NEB 101 is configured as a print server, SAP also registers the print server with the NetWare bindery.

CPRINTSERVER is a custom implementation of a Novell print server application. This module provides self-generated print banners, user notification of completion and exception status, and transmission of print data and status commands to the print engine. This differs from the Novell print server in that CPRINTSERVER is dedicated to driving the local printer (i.e., printer 102 in which NEB 101 is housed) and cannot drive any remote RPRINTERs. This program owns the print data channel for the duration of a print job. RPRINTER is a custom implementation of a Novell RPRINTER print application. This module is a slave application that is sent data by a Novell print server application elsewhere on LAN 100.

The TCP/IP protocol stack has User Datagram Protocol (UDP), Reverse Address Resolution Protocol (RARP) and BootP support within. INTERRUPT is the interrupt handler for the TCP/IP task, while TIMERTICK is the timer tick for UNIX TCP/IP network tasks. LPRINTSERVER is the TCP/IP print server application, and also owns the print data channel for the duration of a print job.

The CPSOCKET program runs for all protocol stacks. The program responds to requests for connection, requests for data download, or requests for services from remote utilities, and provides status and control to other tasks via interprocess communication. Because CPSOCKET typically owns the status and control channel between NEB 101 and printer 102, it is the only task that has the ability to obtain printer status via the status channel. CPSOCKET is responsible for the network connection and packet contents between the Novell-oriented status and control utilities (CPNET), or between the UNIX-oriented status and control utilities (cpnet).

MONITOR is a customized multi-tasking monitor which performs task creation, task destruction and microprocessor dispatch. MONITOR also has memory management submodules MEMGET and MEMFREE. RESIDENT is a block of routines that provides generic services such as NVRAM read and write, FLASH code, ROM based debugger, hardware timer tick and other basic features. POST is a power-on self-test module that checks the integrity of NEB hardware and software at power-up.

Flash EPROM 174 also stores a Network Identification File ("NIF") block which stores board-invariant information such as the Media Access Control ("MAC") address, which is unique for every network board, hardware configuration, board revision number and the like, as well as changeable information such as software version number. The information in the NIF block is used to ensure that flash EPROM 174 is not reprogrammed with an incompatible image. The NIF block is discussed in greater detail below in connection with FIG. 13.

All communication between NEB 101 and printer interface card 150 is executed via 32 KB shared SRAM 200. Arbiter control logic 400, preferably a single 100-pin ASIC, arbitrates between the two byte wide memory accesses of printer interface microprocessor 151 and the single byte wide memory accesses of NEB microprocessor 173, each of which is completely independent of the other.

Generally speaking, the 8-bit data bus of microprocessor 173 on board NEB 101 communicates with bus control logic 410, while the 32-bit data bus of microprocessor 151 on board printer interface card 150 communicates with bus control logic 420. Memory accesses from each bus are routed to shared memory arbiter 430, which determines which bus has priority (in accordance with an arbitration technique discussed below) and permits the bus with priority to access SRAM 200 via SRAM interface 440. Interrupt control register 450 is also accessed through shared memory arbiter 430, to allow one microprocessor to interrupt the other.

[NEB Functionality]

Broadly speaking, NEB 101 is an interactive network circuit board which couples printer 102 to LAN 100, making printer 102 a responsive and interactive network member. NEB 101 receives print job information and status requests from LAN 100, transmits the print data and status commands to printer 102 for execution, receives status information from printer 102, and transmits status information back to LAN 100.

Thus, NEB 101 can not only perform RPRINTER remote printer services and PSERVER print server functionalities, but can also offer to network members a wide variety of status and control features. Through NEB 101, network members can access verbose amounts of status information stored in the NEB, such as the number of print jobs, the number of pages per job, the number of pages per minute, the time per job, the number of total pages per day, and the number of jobs per day. In addition, a great deal of control information may be provided from the network to printer 102, such as, for example, exercising the printer's front panel functions from a networked PC.

All network traffic enters and leaves NEB 101 through either BNC connector 302, which interfaces with network controller 510 through transceiver 171, or RJ-45 connector 301, which interfaces directly with network controller 510. To eliminate the necessity for a user physically to position a switch, NEB 101 includes hardware and software which automatically detects which of the two connectors is coupled to the network. Network communications are transferred between the selected connector and the rest of the board, with network controller 510 along with NEB control logic 520 controlling the flow of data between the network traffic on the selected connector and microprocessor's 173 data bus.

All software modules executed by microprocessor 173 are stored in flash EPROM 174. Some low-level modules which are always needed, such as timer tick and NVRAM read, could be executed directly out of EPROM 174, but for the most part microprocessor 173 does not execute software modules directly from flash EPROM 174, but rather selectively loads those modules that are needed into DRAM 175 for execution from DRAM. By virtue of this arrangement, it is possible to select the specific modules that are retrieved from flash EPROM 174 for execution out of DRAM 175 so as to permit flexible configuration of NEB 101.

For example, because many communication protocol types may be broadcast on LAN 100, NEB 101 includes, in flash EPROM 174, software modules for supporting multiple protocols. NEB 101 monitors all network traffic on the heterogeneous network to determine the protocol type or types in use, and loads the protocol stack or stacks which correspond to the protocols it detects into DRAM 175.

Reprogramming flash EPROM 174 with a new image, which may include a new protocol stack, is also performed via DRAM 175. When a new image and a command to reprogram is received, such as a command received over the network or serial port connector 600, the software reprogramming module is loaded from EPROM 174 to DRAM 175. Microprocessor 173, executing this module from DRAM 175, confirms that the new firmware image is compatible with the configuration of NEB 101, and reprograms EPROM 174 if compatibility is confirmed, as described in more detail below.

Microprocessor 173, executing a loaded protocol stack out of DRAM 175, can send and receive network communications to and from other LAN members using that protocol. Print job data are received by network controller 510 and routed to microprocessor 173 through NEB control logic 520. Microprocessor 173 writes the print job data to shared memory SRAM 200, from which printer microprocessor 151 reads the data and operates print engine 160 in accordance therewith. In addition, each of microprocessors 173 and 151 can write message data to the other microprocessor in another portion of the shared memory.

Access to the shared SRAM 200, as discussed above, is arbited by arbiter control logic 400 according to an arbitration priority technique. Arbiter control logic 400 interleaves concurrent accesses of the two microprocessors with one another by allowing the microprocessors access to the shared SRAM on a first-come first-serve basis, and presenting a wait state to the lower priority processor while the higher priority processor takes its turn. In the case of an exact tie, microprocessor 173 on NEB 101 is arbitrarily given priority.

A large portion of shared SRAM 200 is configured as a ring buffer, into which NEB microprocessor 173 writes print data and out of which printer interface microprocessor 151 reads it. As each processor writes or reads blocks of data, it updates respectively a "put" pointer or a "get" pointer, stored elsewhere in SRAM 200, to indicate the next location that the processor should access.

By virtue of this arrangement, the writing processor can determine if there is available space in the memory in which it may write, and the reading processor can determine whether there is remaining data to be read, by comparing the put and get pointers with one another. To reduce the amount of contention for shared memory between the two processors, NEB microprocessor 173 stops writing to memory (and accordingly stops reading and updating the pointers) at predetermined intervals, allowing printer interface microprocessor 151 sole access to the memory until it catches up, as described in more detail below.

Serial port connector 600 is provided to allow NEB 101 to be debugged from an external computer. Serial port connector 600 is coupled to NEB control logic 520, which accepts serial data from receive data pin 601 of serial port connector 600 and communicates the serial data bit-by-bit to microprocessor 173. Microprocessor 173 configures NEB control logic 520 so that a start bit in the serial data activates the non-maskable interrupt of the microprocessor. Microprocessor 173 then assembles the data bits of the serial data into 8-bit words. In addition, NEB control logic 520 monitors the data bus of microprocessor 173, and passes a serial stream of the data presented thereon to transmit data pin 602 of serial port connector 600, all as described in more detail below.

[Automatic Detection Of Network Hardware Connection]

Network interface cards generally provide several different types of physical connections for connecting network cables to a LAN. NEB 101, for example, provides a BNC connector 302, to which a 10Base-2 coaxial cable may couple, and an RJ-45 connector 301 to which 10Base-T unshielded twisted pair (UTP) wire may couple. Other physical connections, such as an IBM data connector for a shielded twisted pair (STP) wire or an ST fiber optic connector for a fiber optic cable, are also possible.

Typically, when a network interface card is connected to a LAN through one of its several connectors, a user who establishes or changes the connection with the LAN must not only insert the LAN cable in the proper connector, but must also physically change the position of a hard switch, or "jumpers", so that data is routed to and from the proper connector.

Due to human error, however, it is possible for the user to forget to change the jumpers, or to put the jumpers in an improper state with respect to the connection that has been established. In such a situation, of course, the card could not talk to the network at all. Isolating and correcting the problem results in an unacceptable waste of time, manpower and computer resources. A network interface card which automatically senses which connector has been connected to the LAN, and then routes data to and from that connector, would greatly streamline the process for establishing and/or changing connections.

The present invention provides for such automatic detection of the hardware connection by testing, in turn, each of the connectors for an indication of network connectivity, and thereafter selecting one of the connectors so that network communications can be transferred between the selected connector and the on board processor. Briefly, a network controller includes a first detector which detects whether the first connector is electrically connected to the network, and a first register, which the processor can read, which stores a "jabber" bit which indicates whether the second connector is improperly terminated. A second register, which the processor can also read, stores a "good-link" bit which indicates that the first detector has detected that the first connector is electrically connected to the network, and a control register, to which the processor can write, stores a select bit. The control register outputs the selection signal in accordance with the select bit stored therein.

The microprocessor executes a software-controlled selection process by (1) writing a select bit to the control register so as to cause output of a selection signal which selects the first connector (here, RJ-45 301), (2) reading the good-link bit from the second register, (3) maintaining the state of the selection bit when the good-link bit indicates electrical connection to the network, (4) writing a select bit to the control register so as to cause output of a selection signal which selects the second connector (here, UTP 302) when the good-link bit does not indicate electrical connection to the network, (5) reading the jabber bit from the first register, (6) maintaining the state of the select bit when the jabber bit does not indicate improper electrical termination of the second connector, and (7) repeating the selection process when the jabber bit indicates improper electrical termination of the second connector. This sequence allows the selection process to take place long after power-on of the board. Once a selection is made, it is maintained for the entire power-on cycle of the board.

Figure 8:
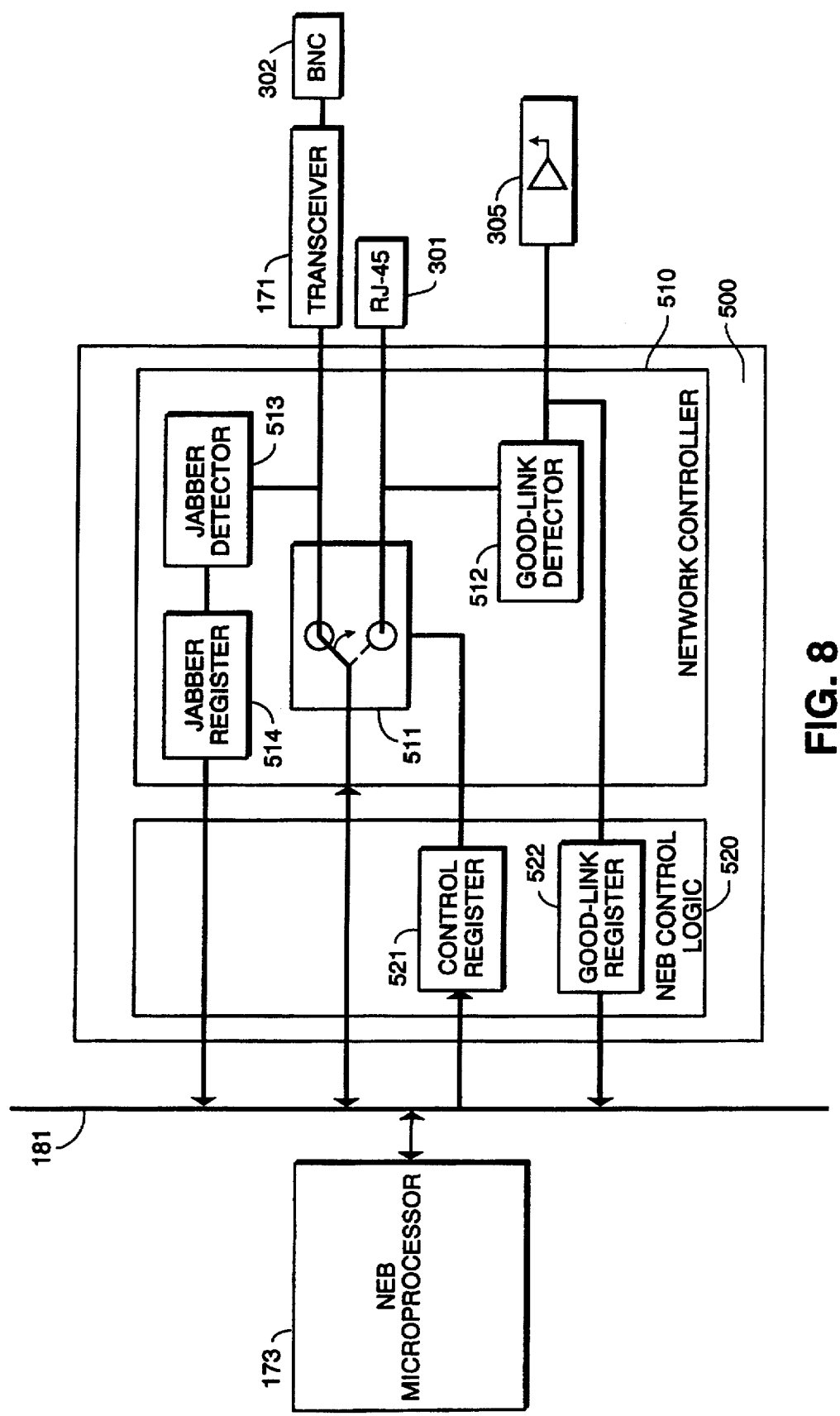
FIG. 8 is a block diagram of an arrangement used to determine which connector is connected to the network.

More particularly, and referring to FIG. 8, BNC connector 302 (through transceiver 171) and RJ-45 connector 301 are each coupled to selector 511 in network controller 510. Network traffic flows to and from microprocessor 173 through bus 181 via either BNC connector 302 or RJ-45 connector 301, depending on the state of selector 511. The position of selector 511 is determined by the output of control register 521.

When RJ-45 connector 301 is coupled to a LAN, an electric current will be present at the connector. Accordingly, network controller 510 includes a good-link detector 512 which monitors RJ-45 connector 301 to determine whether RJ-45 connector 301 is electrically connected to LAN 100. In the 83902 network controller, good-link detector 512 is configured as an open drain N-channel device. When an electrical current is detected at RJ-45 connector 301, the output of good-link detector 512 will be low and status LED 305 will be lit, indicating an electrical connection. If there is no current at RJ-45 connector 301, on the other hand, the output of good-link detector will go high, turning off status LED 305. The output of the good-link bit is also fed to good-link register 522 in NEB control logic 520, which allows microprocessor 173 to read the state of the good-link signal.

A BNC connector, such as BNC connector 302, will "jabber" unless the connector is properly terminated, such as, for example, when it is coupled to a LAN with a T-type coaxial adapter. Network controller 510 includes jabber detector circuit 513, which detects whether there is jabbering at BNC connector 302 in a manner well known in the art, and writes the result of its detection into jabber register 514. Thus, jabber register 514 contains a bit which indicates whether BNC connector 302 is properly terminated. The jabber bit can then be read by software.

Figure 9:
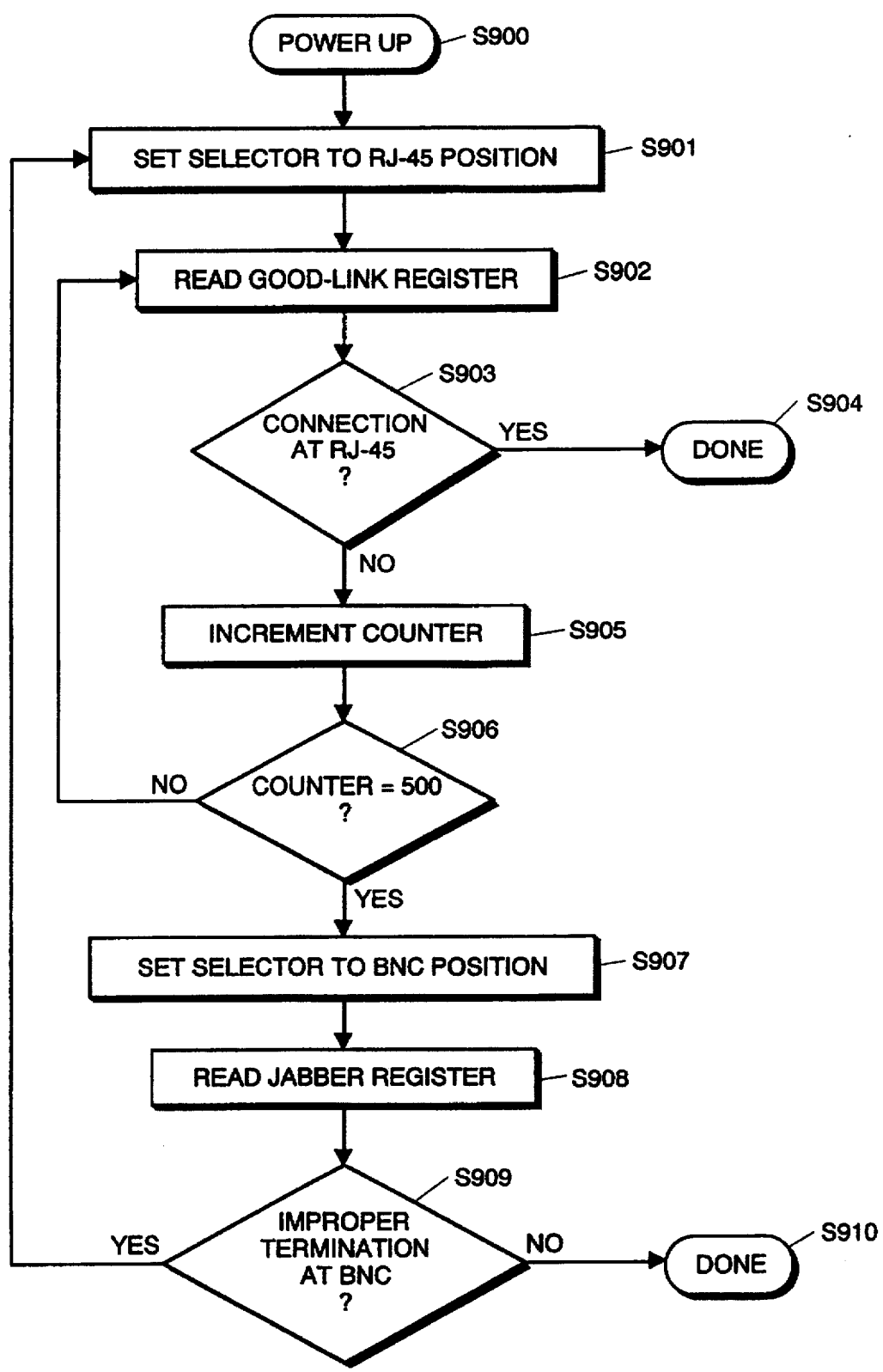
FIG. 9 is a flowchart showing how to detect which connector is connected to the network.

Microprocessor 173 controls the state of selector 511 by executing a software module stored in flash EPROM 174 in a manner that will now be described with reference to the flowchart of FIG. 9. After NEB 101 is powered-up (step S900), microprocessor 173 sets selector 511 to the RJ-45 position by writing a zero to control register 521 via bus 181 (step S901). The program reads the state of good-link register 522 (step S902), and, if the bit stored in good-link register 522 is low (indicating an electrical current), the program determines that RJ-45 connector 301 is coupled to LAN 100, and exits, leaving selector 511 in the RJ-45 position (S903-S904).

Because there is an inherent delay in the switching of the N-channel device which comprises good-link detector 512, it is necessary to give good-link detector 512 ample time to detect an electrical connection. Accordingly, if the bit stored in good-link register 522 is high (indicating no electrical connection), the program will re-read good-link register 522 repeatedly, exiting and leaving selector 511 in the RJ-45 position if the bit is low for any of the reads (steps S905-S906-S902). If the bit stored in good-link register 522 is high after five hundred reads, however, the program sets selector 511 to the BNC position by writing a one to control register 521 (step S907).

The program then reads jabber register 514 (step S908). If the state of jabber register 514 is low (indicating that BNC connector 302 is properly terminated and a BNC connection is present), the program exits, leaving selector 511 in the BNC position (steps S909-S910). If the state of the jabber bit is high (indicating that BNC connector 302 is improperly terminated and thus not connected to LAN 100), the program returns to S901, resetting selector 511 to the RJ-45 position. The program then re-executes itself cyclically until either an RJ-45 or a BNC connection has been established.

Thus, NEB 101 will continue to toggle between BNC connector 302 and RJ-45 connector 301, checking after each toggle whether that particular connector is connected to LAN 100. By virtue of this arrangement, NEB 101 is able to determine, at power-up (and until a connection is made), whether its BNC connector 302 or its RJ-45 connector 301 has been connected to the network, without requiring an operator to physically change a switch. Accordingly, the possibility that NEB 101 will attempt to communicate with LAN 100 through a connector that is not coupled to LAN 100 is eliminated.

In the present embodiment, the selected hardware connection is maintained during the current power-on cycle. It is possible to implement software which, after a selection is made, senses when the hardware connection is no longer valid, and then repeats the selection process, thereby permitting connectors to be changed during the current power-on cycle. This allows for dynamic switching from form one connection to another.

[Network Protocol Sensor]

To ensure proper operation in a multi-protocol system, and to guard against making improper assumptions concerning the protocol and frame type being used on a network, NEB 101 utilizes autoprotocol detection to determine frame types used by network traffic, and to correlate those frame types with a particular one of several different protocols available to NEB 101. Specifically, through use of the PRETASK module stored in flash EPROM 174, NEB microprocessor 173 is able to determine which frame type is being used for network traffic, to correlate that frame type to one of several different protocols, and to load a protocol stack (such as IPX/SPX or TCP/IP) from flash EPROM 174 so as to carry out network communications using that protocol and the detected frame type.

Figure 10:
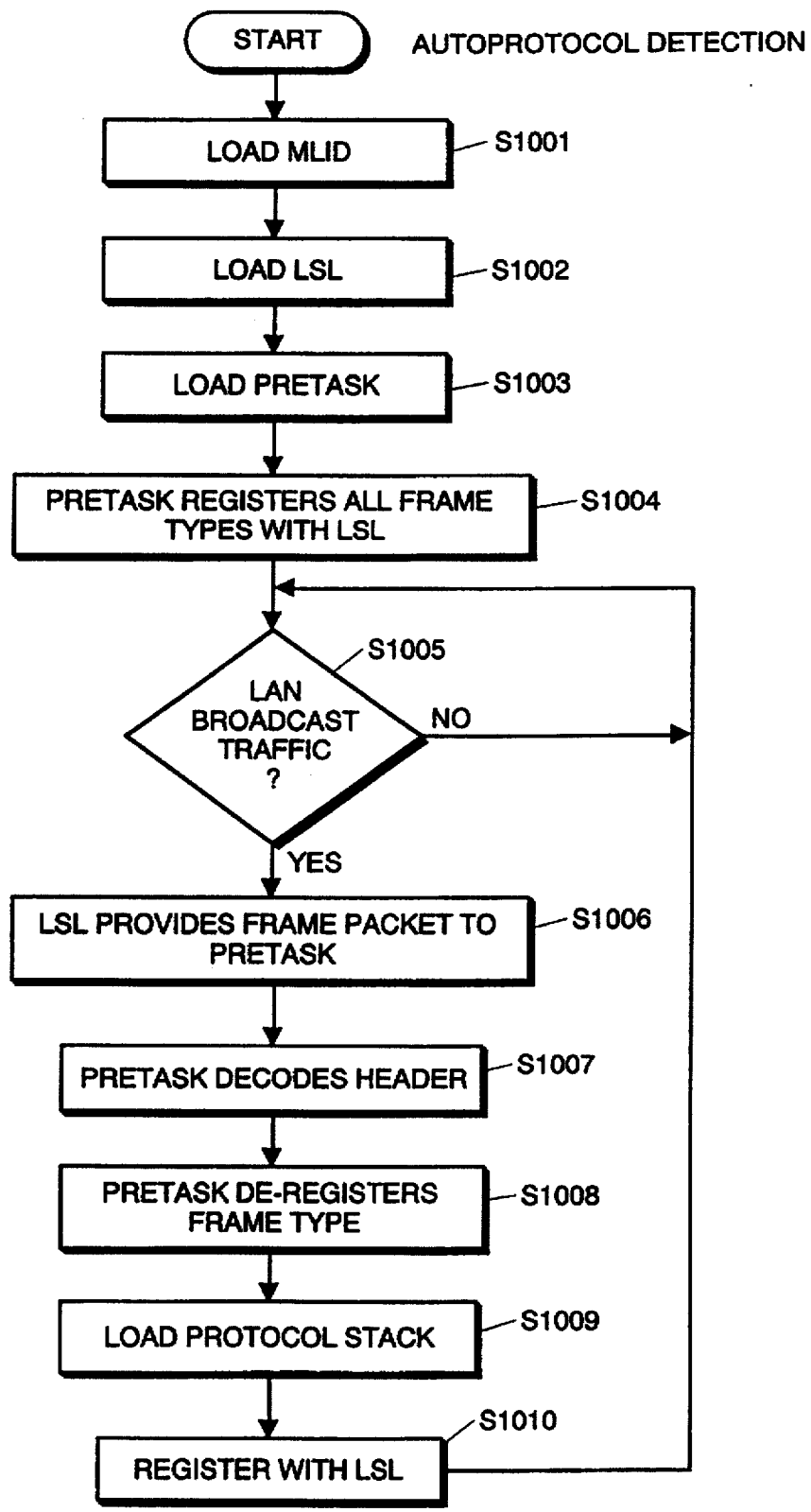
FIG. 10 is a flow chart showing the operation of a PRETASK software module.

FIGS. 10 and 11(a) through 11(d) are used for describing this process. FIG. 10 is a flow diagram showing process steps executed by NEB microprocessor 173 in accordance with the PRETASK software module loaded in flash EPROM 174. PRETASK is similar to, though different from, the PRESCAN software module which is described in co-pending application Ser. No. 07/978,409, "Method And Apparatus For Adaptively Determining The Format Of Data Packets Carried On A Local Area Network", the contents of which are incorporated herein by reference.

In step S1001, microprocessor 173 loads MLID (multi-link interface driver) from flash EPROM 174 into DRAM 175 and begins execution of MLID. As described above, MLID is the lowest level of software that communicates to the network. MLID thus acts as the direct software interface to the network frame packets which are carried on the network wire.

In step S1002, microprocessor 173 loads LSL (link support layer) on top of MLID and begins executing LSL. LSL acts as a multiplexer between the low level MLID and various protocol stacks which may be loaded above it. In particular, LSL accepts registrations of any of the various frame types with which frame packets may be carried on the network. Thus, for example, in an Ethernet environment, LSL will accept registrations of 802.2, 802.3, Ethernet_II and Ethernet_Snap, and in a Token-ring environment LSL will accept registrations for 802.5 and Token_Ring_Snap. By registering a frame type with LSL, a software module above LSL instructs LSL to provide the module with all frame packets that match the registered frame type.

In step S1003, microprocessor 173 loads PRETASK on top of LSL. As mentioned above, PRETASK is responsible for identifying what frame types are associated with the various protocols in which NEB 101 is adapted to communicate. In step S1004, PRETASK registers to receive from LSL all frame types that are supported by MLID. Thus, in the Ethernet environment of the present embodiment, PRETASK registers 802.2, 802.3, Ethernet II and Ethernet_Snap with LSL, thereby instructing LSL to provide PRETASK with all frame packets which match any of the registered frame types.

Flow then advances to step S1005 in which MLID and LSL monitor the network for any traffic. Specifically, in step S1005, the network is monitored for broadcast traffic meaning that the destination of the traffic is unspecified (i.e., "to anyone"). Ordinarily, broadcast traffic is identified by a global specification for the destination MAC address, for example 12 hexadecimal F's in sequence. Until LAN broadcast traffic is detected, PRETASK does nothing.

Figure 11A:
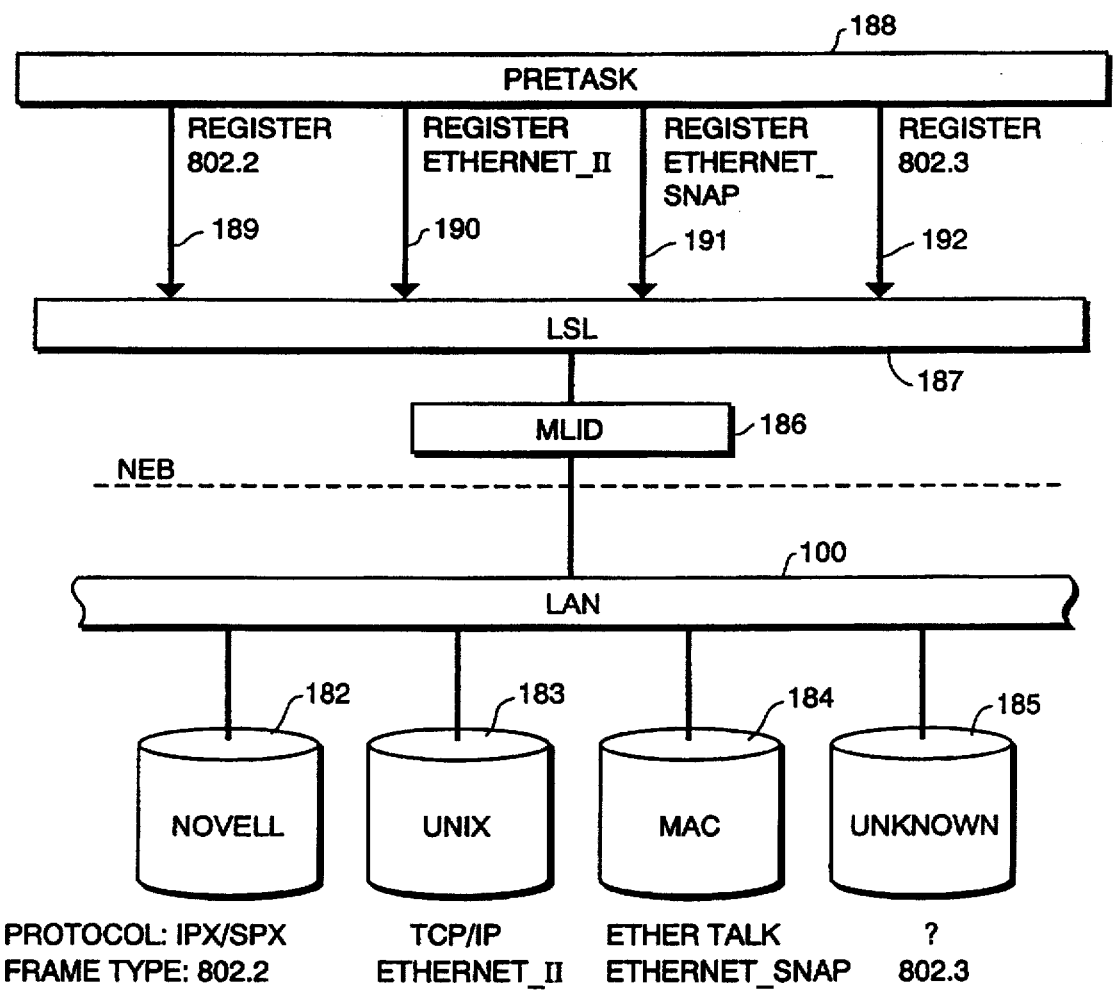
FIGS. 11(a) through 11(d) are diagrams showing possible relationships of various network software modules.

At this point in PRETASK's execution, the relationship of the various software modules is as depicted in FIG. 11(a). As seen there, it is possible for multiple network devices, such as devices 182, 183, 184 and 185, each of which runs a different protocol using a different frame type, all to be connected to a single LAN 100. In FIG. 11(a), device 182 is a Novell device running an IPX/SPX protocol using an 802.2 frame type; device 183 is a UNIX network device running a TCP/IP protocol using an Ethernet_II frame type; device 184 is a Macintosh device running an EtherTalk protocol using an Ethernet_Snap frame type; and network device 185 is an unidentified frame and protocol device using an 802.3 frame type. Of course, the combinations shown in FIG. 11(a) are illustrative only, and it is possible, for example, for a Novell IPX/SPX to use an 802.3 frame type or any of the other frame types. The only requirement is that each protocol is associated with one and only one frame type.

NEB 101 is also connected to LAN 100 and includes LSL 187 loaded on top of MLID 186. PRETASK 188 is shown as having registered each of the different frame types which may be broadcast on LAN 100. Thus, as shown in FIG. 11(a), PRETASK 188 has registered 802.2 at 189, Ethernet_II at 190, Ethernet_Snap at 191, and 802.3 at 192.

When LAN broadcast traffic is detected, flow advances to step S1006 in which LSL provides the frame packet to PRETASK. In step S1007, PRETASK decodes the frame's protocol header so as to identify the protocol in use by that frame packet. The offset to this header varies depending on the frame type the protocol is using. The following table includes some examples of hexadecimal values and the protocol headers that identify the different protocols:

| Hexadecimal Value | Protocol Type |
|---|---|
| 0800 | IP |
| 0806 | ARP |
| 809B | EtherTalk |
| 8137 | IPX/SPX |

Figure 11B:
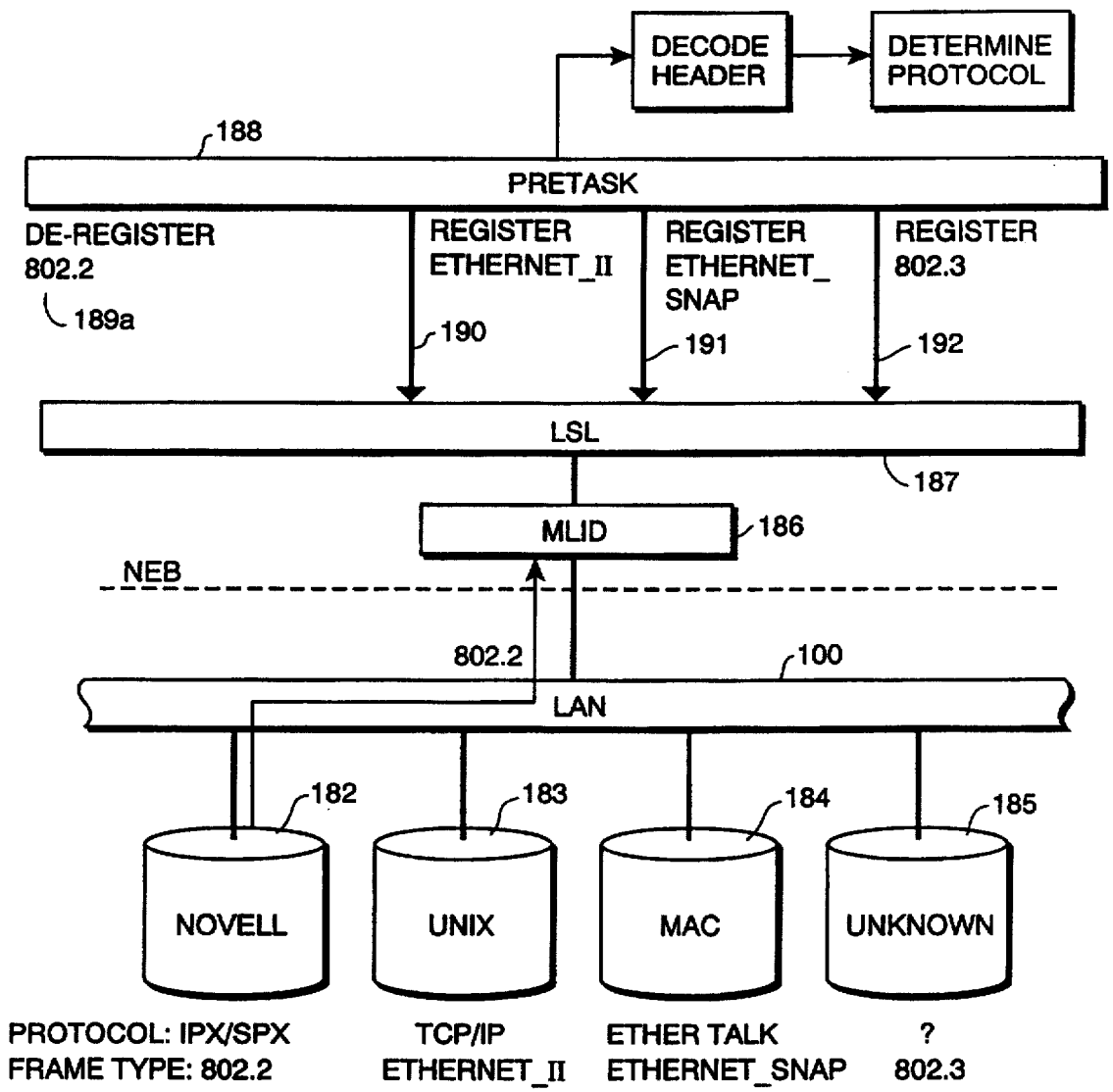

FIG. 11(b) illustrates this sequence. As seen in FIG. 11(b), network device 182 has issued a broadcast frame packet using an 802.2 frame type. Since PRETASK has registered, at 189 as shown in FIG. 11(a), 802.2 with LSL, LSL provides the frame packet to PRETASK. PRETASK decodes the frame's protocol header using the above table so as to determine the protocol in use by that frame type.

Reverting to FIG. 10, in step S1008, PRETASK de-registers the frame type just received from LSL. Thus, as shown at 189a in FIG. 11(b), PRETASK has de-registered 802.2.

While step S1008 shows de-registration in all cases, there are some cases in which it is more preferable not to de-register. Particularly, each different protocol has associated with it a list of allowable frame types. Examples of allowable frame types for IPX/SPX and for TCP/IT are as follows:

| IPX/SPX | TCP/IP |
|---|---|
| Ethernet_II | Ethernet_II |
| Ethernet_snap | Ethernet_snap |
| 802.2 | |
| 802.3 | |

As is evident from the above list, it is possible for two of the frame types (Ethernet_II and Ethernet_Snap) to be used by different protocols. It should also be noted that it is permissible for the same frame type to be used by different protocols on the same LAN. Thus, in a preferred mode, de-registration in step S1008 is not performed when the frame type received by PRETASK in step S1006 can be used by a protocol that has not already registered with LSL (see step S1010, below). This preferred mode allows detection and operation of all protocols permissible on the LAN, since even later-received frame types for a protocol different from those already registered can be properly detected and processed by PRETASK so as to load that different protocol.

In step S1009, PRETASK loads the protocol stack that corresponds to the protocol decoded in step S1007. In the example being used in FIG. 11(b), since an IPX/SPX protocol is decoded, PRETASK loads the IPX/SPX protocol stack from flash EPROM 174. Before loading, the protocol stack is initialized with the frame type, here 802.2, just received from LSL.

Figure 11C:
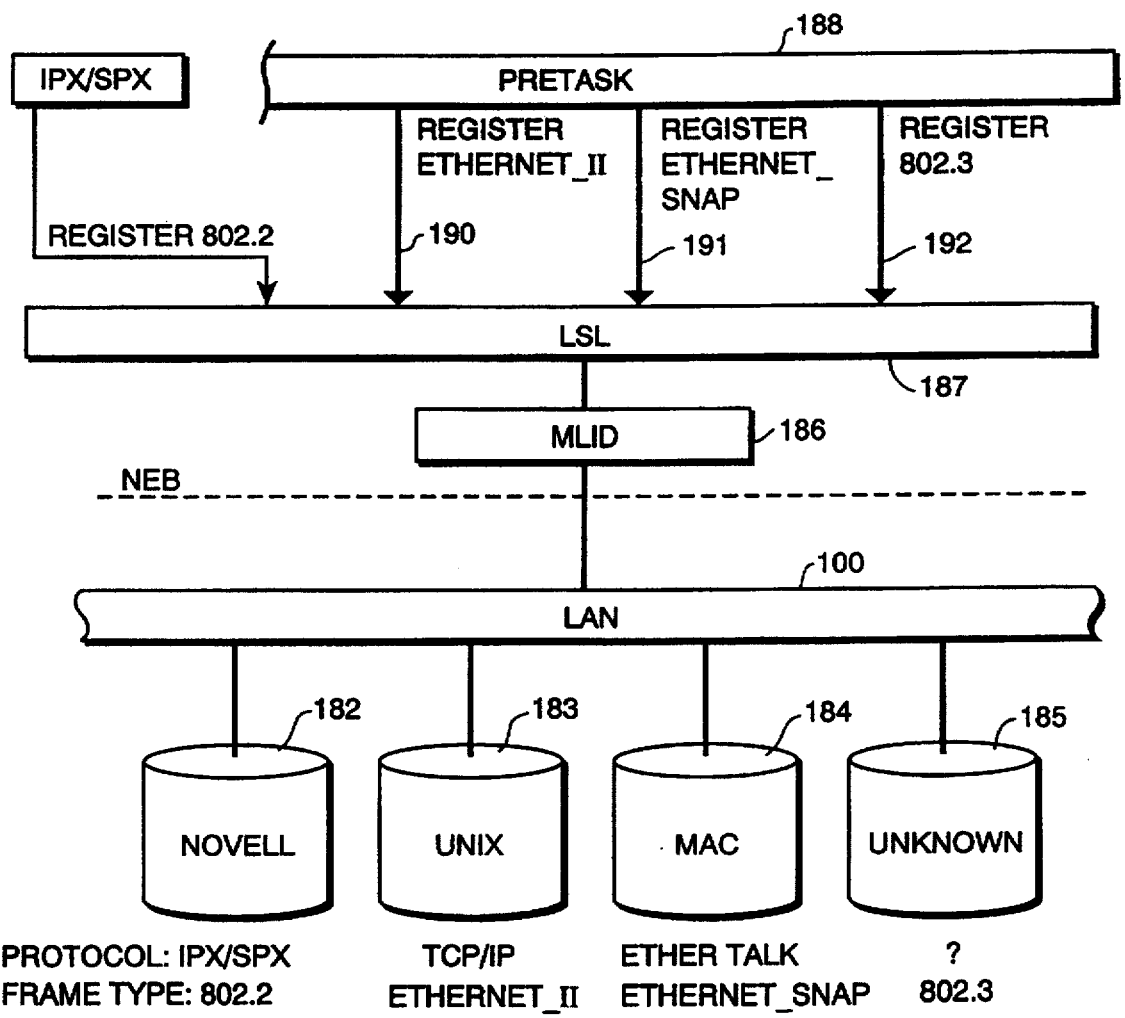

In step S1010, the newly-loaded protocol stack registers itself with LSL, as shown, for example, in FIG. 11(c). As seen there, the IPX/SPX protocol stack registers 802.2 with LSL. By registering, and as described above, IPX/SPX informs LSL to provide all frame packets matching the registered frame type (here, 802.2) to the newly-loaded protocol stack.

PRETASK then returns to step S1005 so as to continue monitoring the network for broadcast traffic. If LSL encounters frame packets which match the remaining frame types registered by PRETASK, LSL provides those frame types to PRETASK for processing in accordance with FIG. 10. Thus, as additional frame types are encountered, such as a frame type associated with a TCP/IP protocol, those frames are processed by PRETASK so as to load the appropriate protocol stack from flash EPROM 174.

Figure 11D:
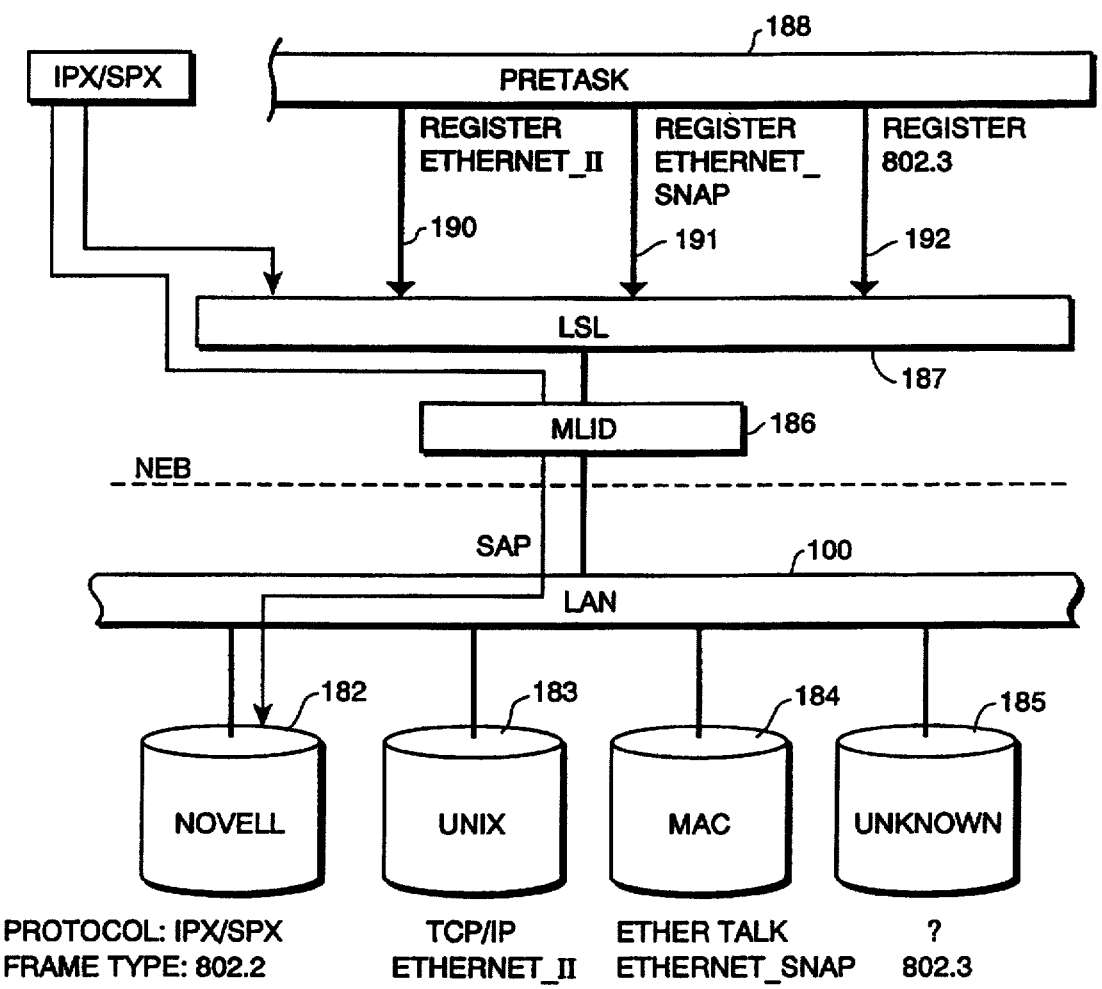

Meanwhile, as shown in FIG. 11(d), since a protocol stack has been loaded, it now begins to operate on the network. Specifically, whereas PRETASK was completely passive and did not broadcast any network communications, IPX/SPX broadcasts its associated SAP requests. Other protocol tasks loaded by PRETASK would broadcast their associated requests. For example, if a TCP/IP protocol stack were loaded then that protocol stack would broadcast RARPs so as to obtain its address from the nearest network server.

[Smart Flash]

As local area networks grow more complex, it becomes necessary to upgrade network interface cards, such as NEB 101, with the most current technologies available. Thus, while NEB 101 is shipped with operational software, that software can be reprogrammed subsequently over LAN 100. For example, from the network administrator's PC 103, the network administrator can remotely alter the ROM firmware image in flash EPROM 174 by downloading new data, which may contain for example patch codes, manufacturing test routines, entire firmware updates, and different language versions.

Figure 12:
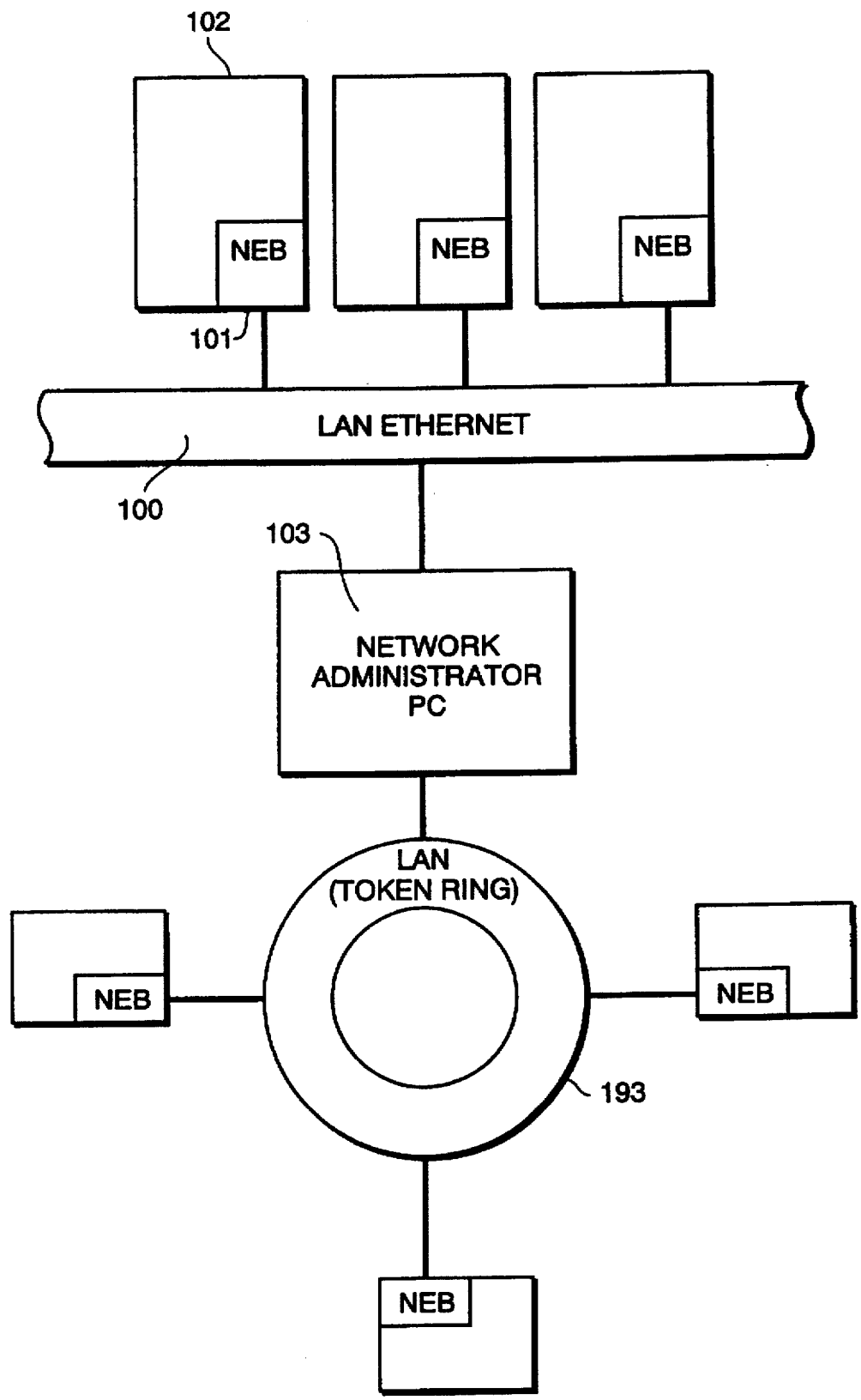
FIG. 12 is a block diagram showing a PC connected to a Ethernet local area network and a Token-ring local area network.

A typical PC may be connected to more than one LAN. For example, as shown in FIG. 12, PC 103 is connected to LAN 100, which is an Ethernet LAN, and to LAN 193, which is a Token-ring LAN, and may in fact function as the network administrator's PC for both networks. Each of the LANs may in turn be connected to several printers, each of which houses an individual NEB. Other reprogrammable devices might also be connected to one or both of the LANs. Thus, there are multiple NEBs, or other devices, which the network administrator can potentially reprogram.

To reprogram a particular NEB, the network administrator from PC 103 activates a program that scans the network bindery to identify suitable flash targets from all network devices connected to the network. Suitable flash targets include all NEB-like devices which have flash capabilities and include Ethernet devices and. Token-ring devices. The network administrator selects one of the devices for reprogramming and establishes network communication with that device. The flash EPROM on board then reprograms itself with the new image.

Because the network administrator may be administrating two or more networks, each of which has several reprogrammable boards connected to it, the administrator must be certain that the proper image is sent to the targeted NEB. Thus, in the case where the network administrator wishes to reprogram flash EPROM 174 on NEB 101 (where the NEB is connected to an Ethernet LAN), he must be certain that the image he sends is an Ethernet image, and that it is compatible with other aspects of NEB 101.

The results of downloading an incompatible image can be devastating. For example, if the network administrator erroneously downloads a Token-ring image to NEB 101, and NEB 101 subsequently reprograms its flash EPROM 174 with that image, then NEB 101 will no longer be able to communicate on Ethernet LAN 100 at all. This means that NEB 101 could not even be reprogrammed over LAN 100; it is, quite literally, a "dead" board as far as the Ethernet LAN is concerned. Other incompatibilities, such as, for example, incompatibilities in the host interface configuration (the type of interface between the NEB and the peripheral in which it is housed), product configuration (the NEB's board type), processor configuration (the type and speed of the processor on board), and memory configuration (the size and erasability of the various on board memories), can result in problems as well. Thus, where there are prior generations of a product, flashing software which works only with newer generations will also result in a "dead" board.

To prevent such disastrous results in the case where an incompatible image is downloaded, NEB 101 includes a software code which ensures that the downloaded image is compatible before actual reprogramming occurs. More particularly, flash EPROM 174 in NEB 101 stores a current program image which includes a network information file (NIF) block which contains configuration information for NEB 101, and a software module for reprogramming flash EPROM 174. Microprocessor 173 sends and receives network communications, and when a new program image is received over the network, microprocessor 173 downloads the new image into DRAM 175, confirms that the new program image is compatible with the configuration information in the NIF block, and reprograms flash EPROM 174 only in the case where compatibility is confirmed.

Figure 13:
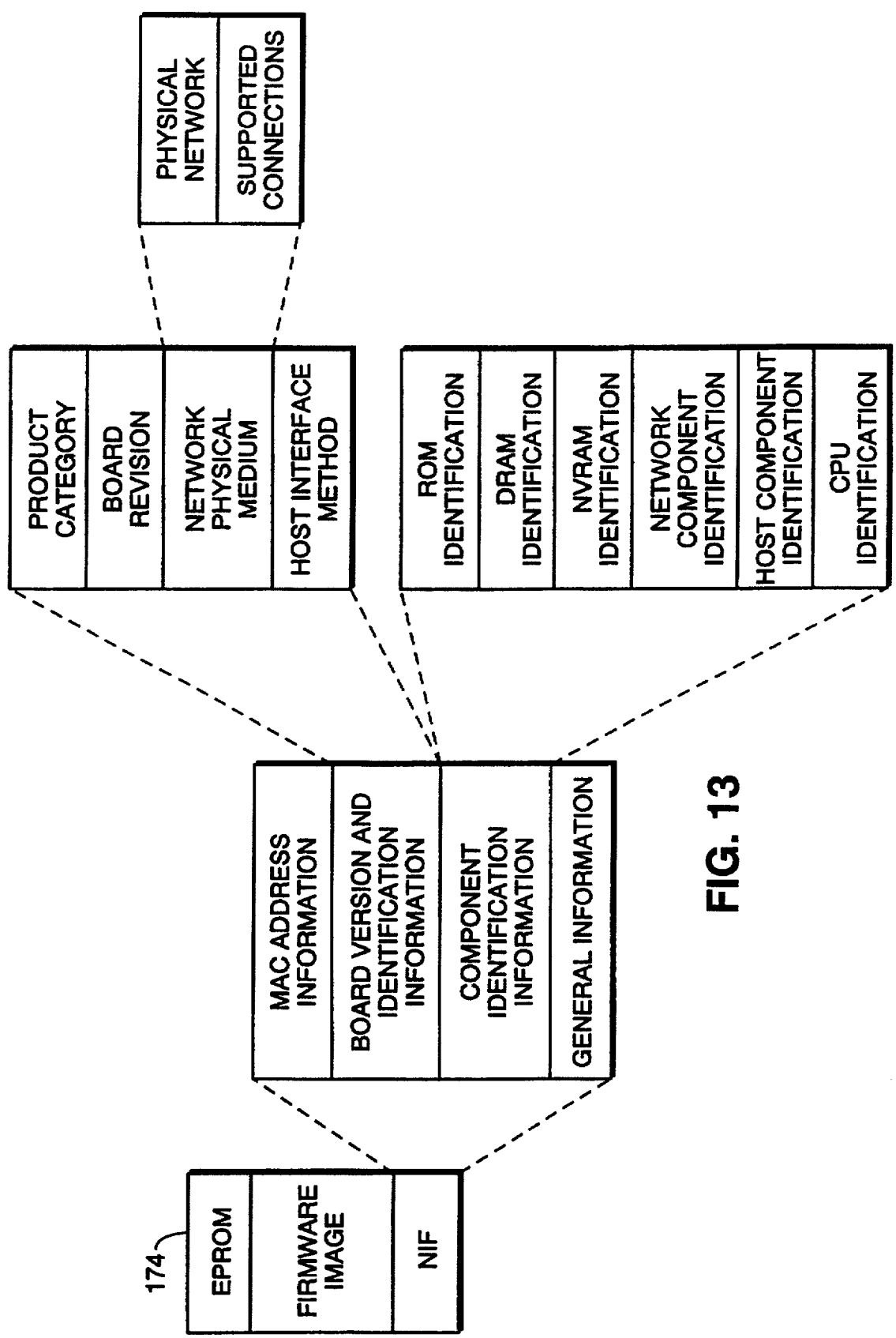
FIG. 13 is a diagram showing contents of a network information file block used for storing configuration information.

In greater detail, the NIF block contains permanent, adapter specific configuration information, and is unique for each individual NEB. In a preferred embodiment, the NIF block occupies 32 bytes of memory space in flash EPROM 413, and is divided into 4 banks of 8 bytes each. As shown in FIG. 13, the NIF block includes a MAC address information bank, a board version and identification information bank, a component identification information bank and a general information bank.

The MAC address information bank, as the name implies, stores the board's unique MAC address. The board verification and identification information bank is subdivided into four smaller banks. Because network interface cards other than the NEB may be coupled to the LAN as well, a product category bank identifies the type of product coupled to the LAN and a board revision bank identifies the product's revision number.

The network physical medium bank is further subdivided into a physical network bank, which identifies the physical medium on which the board is used (such as, for example, Ethernet, Token-ring or FDDI) while the supported connectors block identifies the types of physical connectors the board supports (such as, for example, 10baseT, 10base2 and 10base5 in the case of an Ethernet network, and UTP and STP in the case of a Token-ring network). In the host interface method bank, the type of interface to the peripheral that houses the board (such as printer 102 in the case of NEB 101) is identified. Examples of such interface types include shared RAM, small computer system interface SCSI), standard parallel interface, RS-232C serial interface and centronics parallel interface.

The component identification information bank is also subdivided into several smaller banks. These banks identify the sizes and granularities of the ROM, DRAM and NVRAM on the board, as well as the erasability of the ROM. In addition, the network controller (DP83902 chip in the case of Ethernet and TI380C25 in the case of Token-ring) and host controller (arbited shared RAM, NCR53C90A SCSI controller or NCR53C80 SCSI controller) are identified. In the CPU identification bank, the type of processor and the clock speed are stored. Finally, the general information bank can store other data identifying additional configuration attributes of the board such as hardware revision level.

Figure 14:
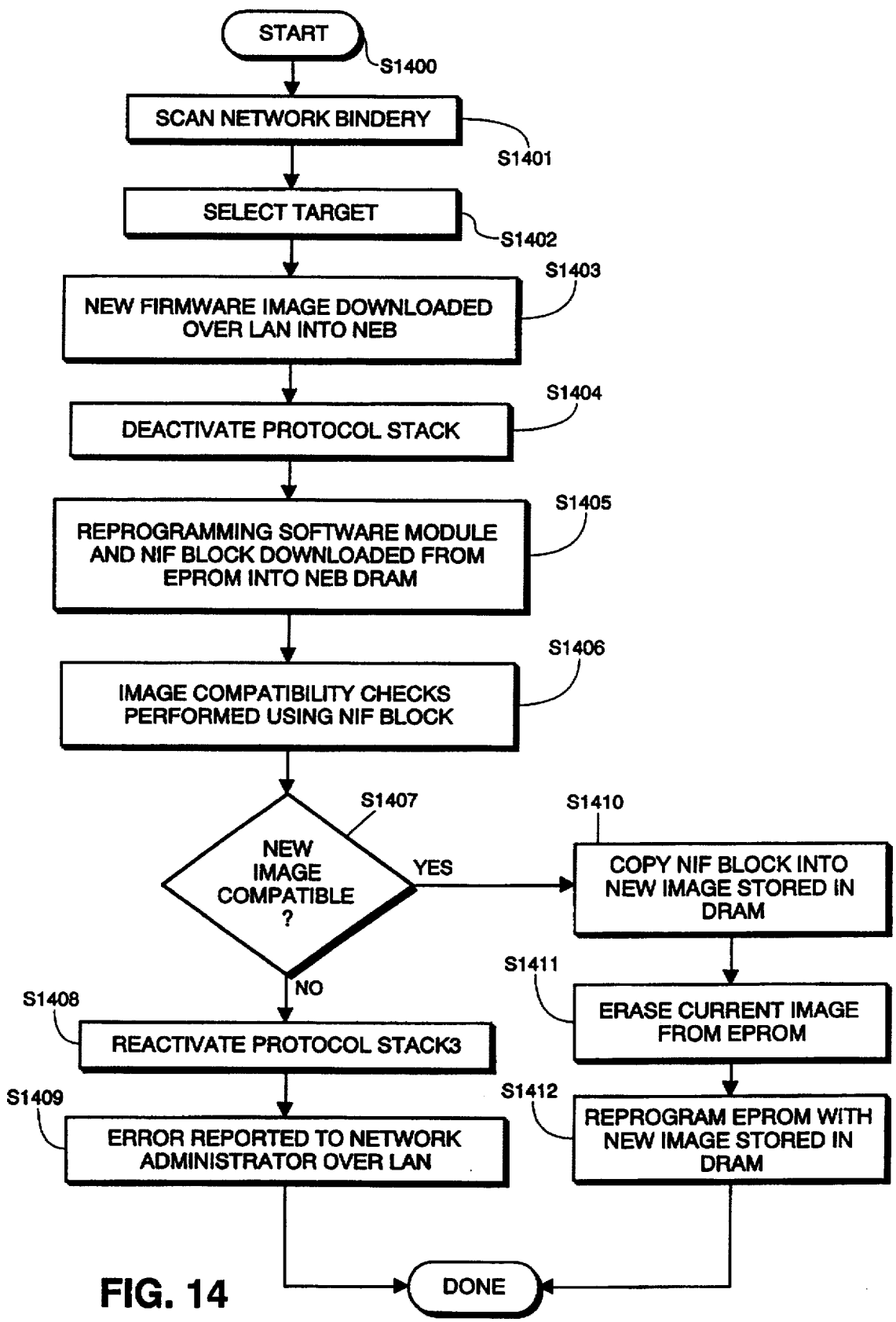
FIG. 14 is a flowchart showing reprogramming of flash EPROM.

Referring to FIG. 14, a reprogramming of flash EPROM 174 of NEB 101 begins when the CPFLASH program on the network administrator's PC scans the bindery (step S1401) and presents a list of potential flash targets to the administrator. The administrator selects a target (step S1402) and CPFLASH establishes communication with the target and downloads the new firmware image over LAN 100 where it is stored in the NEB's DRAM 175 (step S1403).

Once the new image is downloaded into DRAM 175, NEB microprocessor 173 deactivates the protocol stack that it is executing, since it is, at least potentially, about to be programmed, and cannot engage in network communications during that time (step S1404). Microprocessor 173 next copies the current NIF block from flash EPROM 174 to DRAM 175 (step 1405) and begins executing the software reprogramming module.

The software reprogramming module then performs image compatibility checks, referencing the information stored in the current image NIF block (which has been copied to DRAM 175), and comparing that information with the information stored in the new firmware image NIF block, to ensure that the new image is compatible (step S1406). Because the NIF block contains a great deal of information about NEB 101, a variety of checks are possible to determine such compatibility.

A first compatibility check includes a network media configuration check to determine if the new image is of the correct network medium type (e.g., Ethernet or Token-ring) by referencing the data stored in the physical network bank of the NIF block. Similarly, a second compatibility check includes a host interface configuration check to determine if the new image is an image for interfacing with the proper host (e.g., shared RAM or SCSI) by comparing the data stored in the host interface method and host interface controller banks of the NIF block with the new image.

A third compatibility check includes a product configuration check that is performed by referencing the product category and board revision banks of the NIF block and comparing that data with the new image to determine whether the new image is for the type of board on which the EPROM is housed. Also, a processor configuration check can be performed by referencing the CPU bank of the NIF block to determine whether the new image is compatible with the on board microprocessor. In addition, a memory configuration check can be performed by comparing the data stored in the ROM, DRAM and/or NVRAM banks of the NIF blocks with the new image to determine whether the new image is compatible with the board's memory. Other compatibility checks, using other information stored in the NIF block, are also possible.

If it is determined that the new image is incompatible, the current protocol stack is reactivated (steps S1407–S1408) and an error is reported to the network administrator's PC 103 over LAN 100, advising that an attempt has been made to reprogram NEB 101 with an incompatible image (step S1409).

On the other hand, if the new image is compatible, then board-invariant portions of the NIF block of the new image are replaced with the corresponding portions of NIF block of the current image, in order to preserve any board specific information (such as the MAC address and board revision number) contained therein (steps S1407–S1410). The program then erases the current image from flash EPROM 174, and reprograms flash EPROM 174 with the new image stored in DRAM 175, which now includes the original NIF block.

By virtue of this arrangement, microprocessor 173 will never reprogram flash EPROM 174 with an incompatible image, even in the case where an incompatible image was erroneously downloaded over LAN 100. Rather, in the case where a network administrator does attempt to reprogram NEB 101 with an incompatible image, NEB 101 will send a message back to the network administrator, advising him of the incompatibility. Accordingly, a fail-safe measure against such human errors is provided in an inexpensive, efficient way.

[Arbitration Device]

Figure 15:
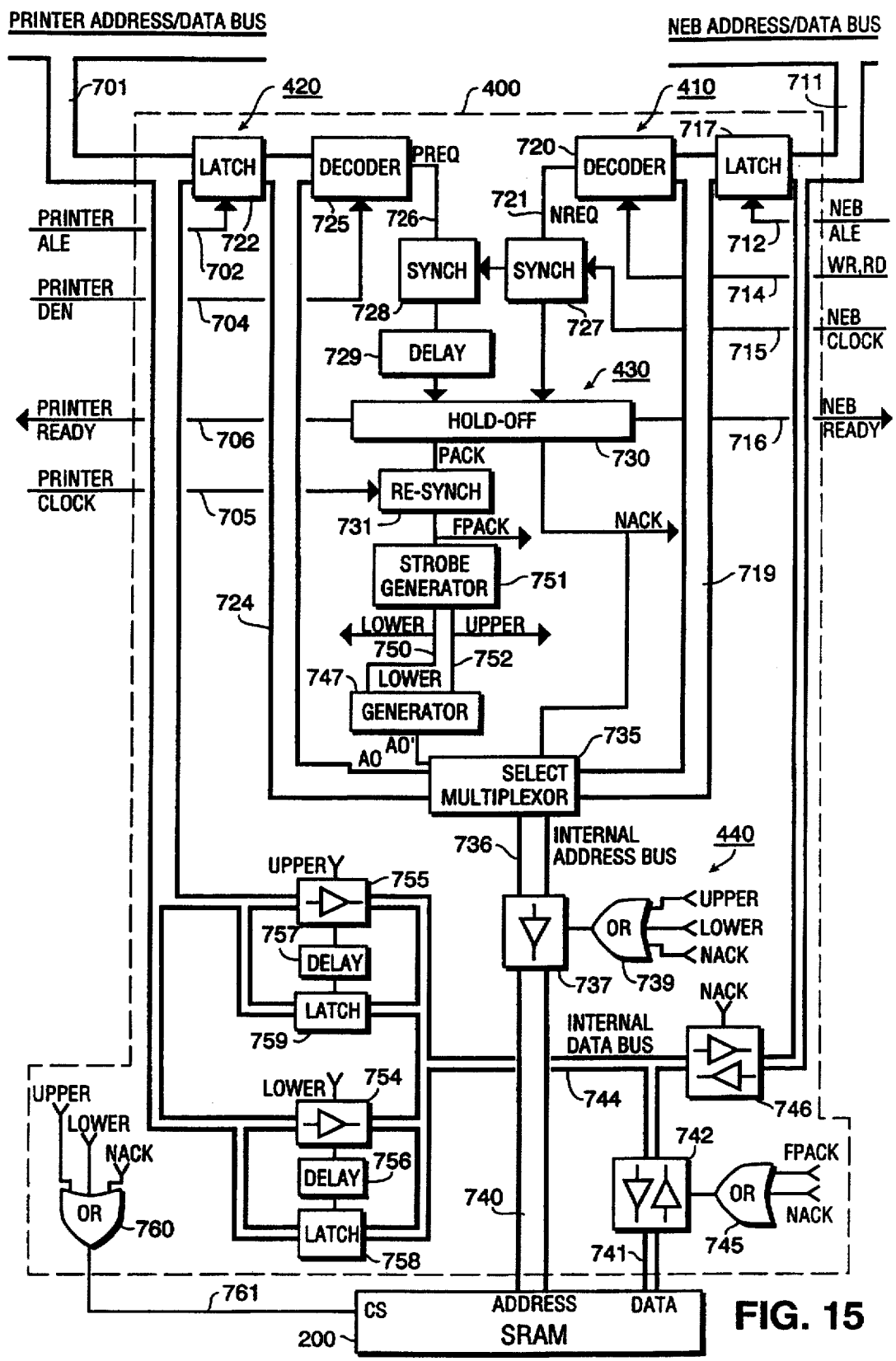
FIG. 15 is a block diagram of a memory arbitration device.
Figure 16:
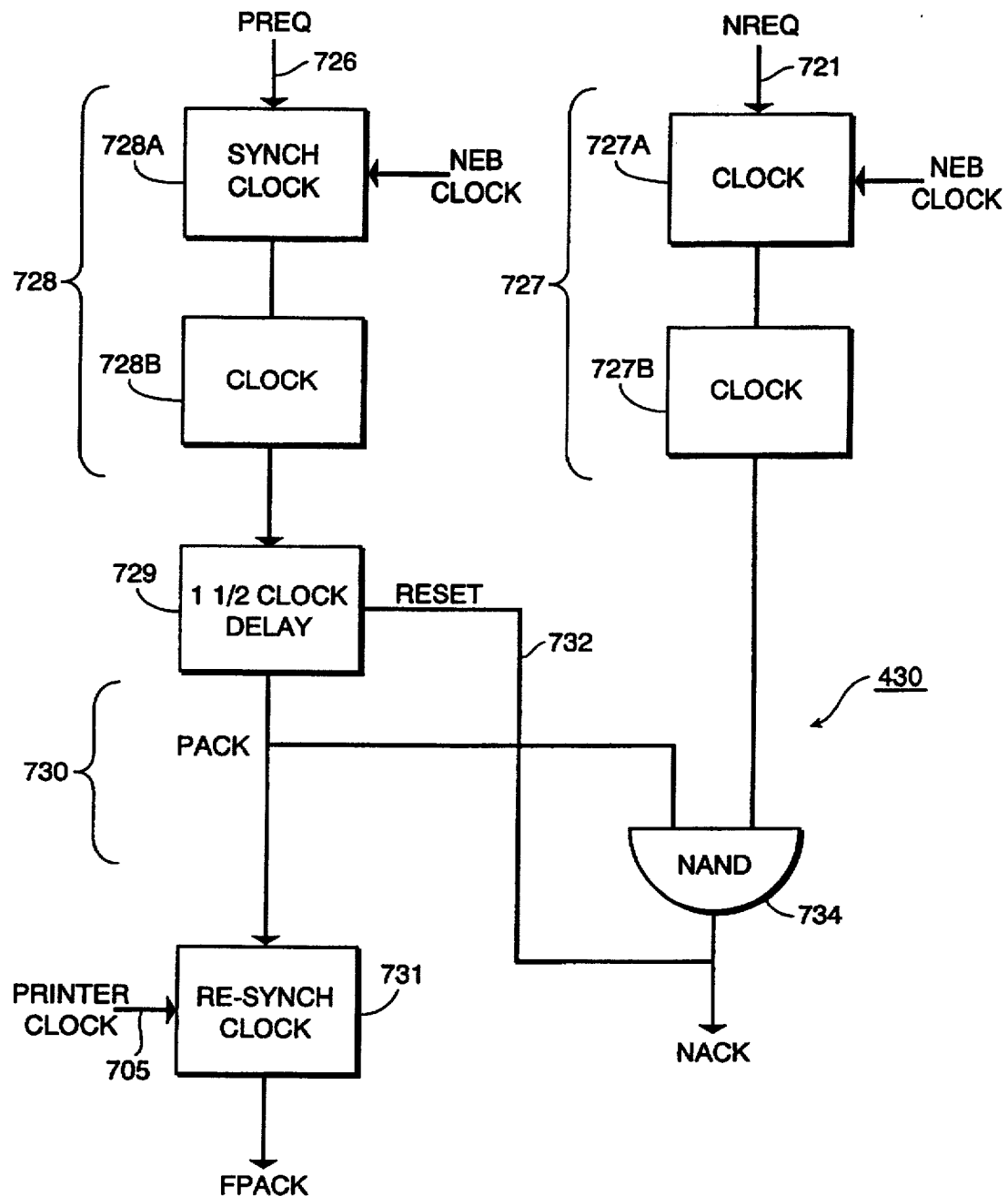
FIG. 16 is a block diagram of one preferred construction of a shared memory arbiter in the arbitration device.
Figure 17:
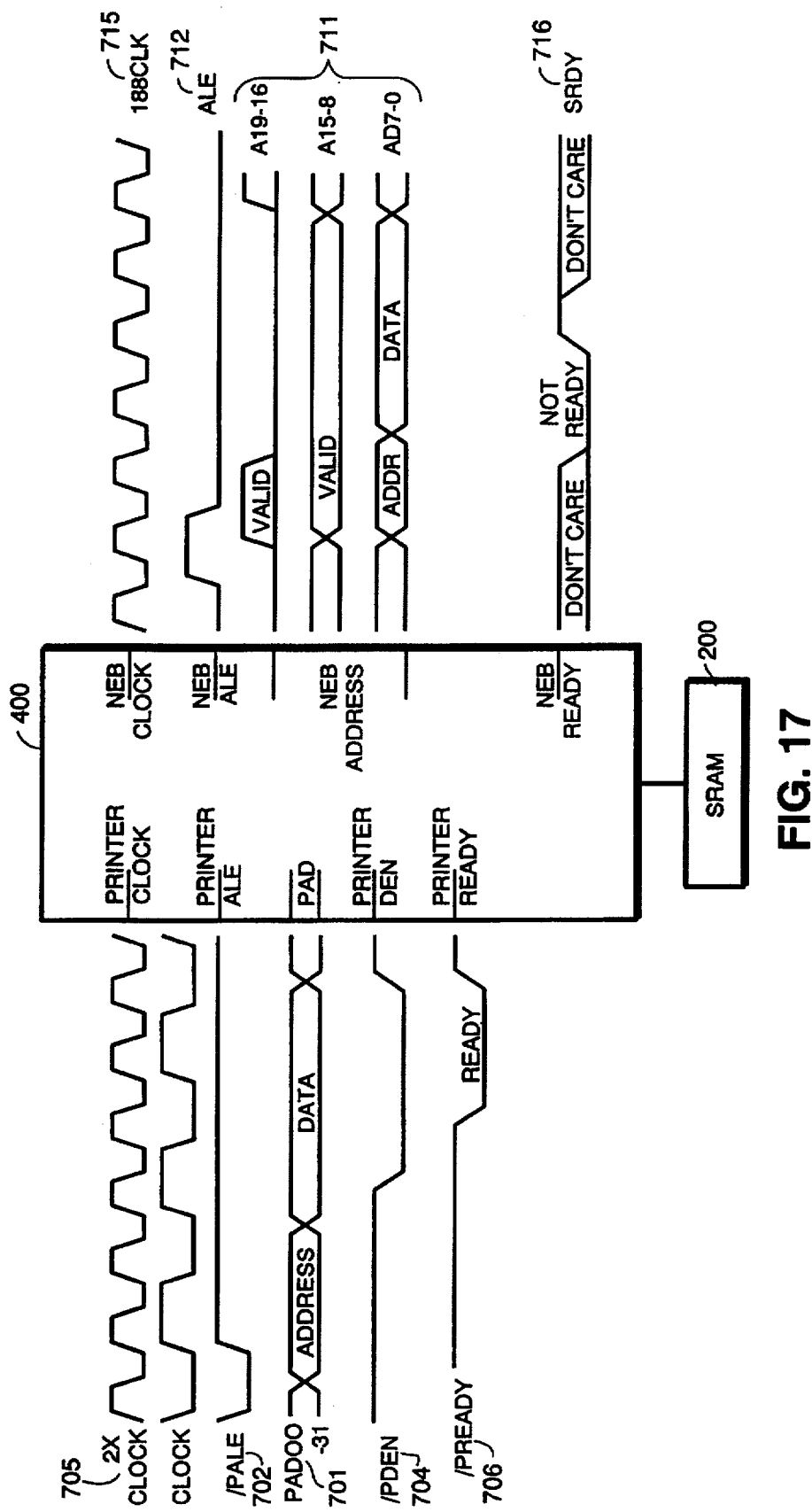
FIG. 17 is a diagram showing the timing of signals provided to the arbitration device.

FIGS. 15 through 17 are views for explaining arbitration of shared SRAM 200 in response to access requests from printer interface card 150 or from on-board NEB microprocessor 173.

FIG. 15 shows printer address/data bus (A/D bus) 701, print address latch enable (ALE) signal 702, printer data enable (DEN) signal 704, printer clock line 705 and printer ready signal 706. These signals are all received via printer interface connector 170 from printer interface card 150. Specifically, for example, A/D bus 701 is the A/D bus for printer microprocessor 151 mounted on printer interface card 150. Printer ALE signal 702 is a signal indicating when valid address information is carried on A/D bus 701, and printer DEN signal 704 is a signal indicating when valid data information is carried on A/D bus 701. Printer clock 705 is the main clock signal for printer microprocessor 151, and printer ready signal 706 is a signal which, when false, indicates to microprocessor 151 that a memory access is not complete and that microprocessor 151 should insert wait states until memory access is complete.

Also shown in FIG. 15 is NEB address/data bus (A/D bus) 711, NEB ALE 712, read and write signals (WR and RD) 714, NEB clock 715 and NEB ready signal 716. NEB A/D bus 711 is the main address bus for microprocessor 173, and carries address and data information for all components mounted on NEB 101. NEB ALE signal 712 is a signal indicating when the valid address information is available on A/D bus 711, read and write signals 714 are signals indicating when valid data information is available on A/D bus 711 and, in addition, whether to read or to write that data, NEB clock 715 is a main clock signal supplied by crystal oscillator 172, and NEB ready signal 716 is a signal which, when false, indicates to NEB microprocessor 173 that a memory access is not yet available and that microprocessor 173 should insert wait states until memory access is available.

Printer microprocessor 151 and NEB microprocessor 173 communicate, as mentioned above, through shared SRAM 200. Access requests for shared SRAM 200 are issued by microprocessor 151 and microprocessor 173 on A/D buses 701 and 711, respectively, and are arbitrated by arbiter control logic 400, as described above. More particularly, and as described above with respect to FIG. 6, arbiter control logic 400 includes bus control logic 410 for controlling the bus accesses on NEB A/D bus 711, bus control logic 420 for controlling bus traffic on printer A/D bus 701, shared memory arbiter 430 for arbitrating between access requests on A/D bus 701 and A/D bus 711, SRAM interface 440 for interfacing printer A/D bus 701 and NEB A/D bus 711, respectively, to address and data buses for SRAM 200. Each of those sections is described in more detail below.

Bus control logic 410 includes latch 717 which latches address information on NEB A/D bus 711 in response to NEB ALE signal 712 so as to provide latched address information 719. Decoder 720 decodes latched address information when read or write signal 714 is active so as to provide a NEB request signal (NREQ signal) 721 in the event that address information on NEB A/D bus 711 corresponds to address space of shared SRAM 200.

Likewise, bus control logic 420 includes latch 722 which latches address information on printer A/D bus 701 when printer ALE signal 702 is high so as to provide latched address information 724. A decoder 725 is responsive to latched address information and outputs a printer request signal (PREQ) 726 when printer DEN signal 704 is active in the event that the latched address information corresponds to address space of shared SRAM 200.

Shared memory arbiter 430 includes synchronization circuitry to synchronize the PREQ and NREQ access request signals to a common clock, here NEB clock 715, a delay circuit which inserts a fractional clock delay into one of the request signals, a hold off circuit which grants access to a first-received request signal and holds off access to later-received access requests, and a re-synchronization circuit. Specifically, both NREQ 721 and PREQ 726 are provided to synchronization circuits which are both synchronized to NEB clock 715 so as to synchronize both access requests to a common clock. In the specific instance illustrated herein, PREQ, which is inherently synchronized to its own printer clock signal 705 is synchronized to NEB clock signal 715. Delay 729 is inserted into one of the access request signals, here into the access request signal from the printer, so as to produce offset request signals. The delay circuit inserts a fractional clock delay, such as a one-half clock delay, so as to ensure that even if both access requests are issued at exactly the same time, one access request will reach hold off circuit 730 before the other.

Hold off circuit 730 outputs first and second access grant signals PACK and NACK, in correspondence to the first and second access request signals. Exactly one of the first and second access grant signals is activated in correspondence to which of the first and second offset request signals is received first. The other (or later-received) offset request signal is held off until processing of the first-received access request signal is complete. To indicate to the held-off microprocessor that access is denied, a not-ready signal is issued. For example, in a case where a NEB access request is received after a printer access request, hold off circuit 730 grants access to the printer and holds off access by the NEB. In that case, NEB ready signal 716 is de-asserted indicating to microprocessor 173 to insert wait states until access is granted. Conversely, if a NEB access request is received before a printer access request, hold off circuit 730 grants access to the NEB and holds off access to the printer. In that case, hold off circuit 730 delays printer ready signal 706 to indicate to microprocessor 151 to insert wait states until access is granted.

The PACK access grant signal for the printer is then fed to the re-synchronization circuit 731 in which the de-synchronized signal is re-synchronized with its own clock. The re-synchronized signal is designated as FPACK. The re-synchronized access grant signals, FPACK and NACK, are then fed to SRAM interface 440 which provides proper interface between the microprocessor that has been granted access and the shared SRAM 200.

Shared memory arbiter 430 is preferably constructed from D-type flip flops and standard logic circuitry. One preferred construction is shown in FIG. 16. As seen there, access request signal 726 from the printer is fed to a synchronizing D-type flip flop 728a which is clocked by NEB clock signal 715 and subsequently to a second D-type flip flop 728b. At the same time, access request signal 721 from the NEB is fed to the input of a D-type flip flop 727a and subsequently to a second D-type flip flop 727b. These two flip flops 727a and 727b are provided so as to ensure suitable synchronization and delay of access request signal 721. Trailing-edge-triggered D-type flip flop 729 is provided so as to insert a 1 ½ clock delay into access request signal 726 from the printer. Output of flip flop 729 is held low by reset signal 732 which is provided in the event that an access grant signal has already been provided to the NEB (i.e., the NACK signal is high). On the other hand, if access has not yet been granted to the NEB, then any access request signals from the printer are clocked through so as to form the PACK signal. The PACK signal is sent to re-synchronization flip flop 731 which is clocked by printer clock 705. At the same time the PACK signal is provided to NAND gate 734 which operates in conjunction with the clocked NEB access request signal. If access has been granted to the printer, then NAND gate 734 ensures that access is not granted to NEB, even if requested, until PACK goes low.

By virtue of the arrangement shown in FIG. 16, although the hold off circuit 730 outputs first and second grant signals, only exactly one of those first and second grant signals is activated at any one time. That is, if access is granted to the printer, then access is held off to the NEB; conversely, if access is granted to the NEB, access is held off to the printer.

Returning to FIG. 15, SRAM interface 440 receives the re-synchronized printer access grant signal FPACK as well as NEB access grant signal NACK and, based on which of those signals is active, coordinates access between either printer microprocessor 151 or NEB microprocessor 173 to shared SRAM 200.

More particularly, as shown in FIG. 15, the NEB access grant signal NACK is provided to multiplexer 735 which selects either latched NEB address information 719 or latched printer address information 724 in accordance with the NACK signal and provides the selected address information onto internal address bus 736. In the case that NACK is active, then multiplexer 735 provides all thirteen (13) bits of latched NEB address information 719 onto internal address bus 736. On the other hand, if NACK is not active (i.e., the printer has access), then multiplexer 735 provides twelve of the thirteen bits of latched printer address information 724 onto internal address bus 736. The thirteenth bit, here A0, is provided by generator 747, in a manner described below.

Buffer 737 buffers address information from internal address bus 736 onto SRAM address bus 740. Buffer 737 is activated from the output of OR gate 739. OR gate 739 accepts as one of its inputs the NEB access grant signal NACK; accordingly, as soon as NACK goes high buffer 737 buffers the address information on internal address bus 736 onto SRAM address bus 740.

In accordance with whether a read or a write is requested, that is, in accordance with the status of the read or write signal 714, SRAM 200 either receives or puts data information onto its data bus 741. That data information is transferred via bi-directional buffer 742 onto internal data bus 744. Bi-directional buffer 742 is activated by the output from OR gate 745 which accepts as one of its inputs NEB access grant Signal NACK. Accordingly, when NACK goes high, the output of OR gate 745 goes high which in turn allows transfer of data information from SRAM data bus 741 to internal data bus 744. Data information on internal data bus 744 is transferred to NEB A/D bus 711 by bi-directional buffer 746 which is activated by the NEB access grant signal NACK. Since the NEB access grant signal NACK derives itself ultimately from decoder 720 which is triggered by read or write signal 714., timing of data information on NEB A/D bus 711 is proper inasmuch as bus 711 no longer expects valid address data to appear on it but rather now expects valid data information to appear on it.

Thus, in summary, when the NEB is granted access to shared SRAM 200, latched address information from latch 717 is buffered onto SRAM address bus 740 via multiplexer 735 and buffer 737, and data information is buffered to (or from) NEB A/D bus 711 from (or to) SRAM data bus 741 via bi-directional buffers 742 and 746. When access operations for the NEB are complete, any held off access requests from the printer are processed.

In the event that printer microprocessor 151 has been granted access to shared SRAM 200, then even though printer microprocessor 151 uses the same 13-bit wide address that NEB microprocessor 173 uses, because microprocessor 151 has a data bus width which is different than that of SRAM 200, upper- and lower-byte buffers are required so as to resolve these bit-width differences. More particularly, as described above, printer microprocessor 151 is a 32-bit Intel 80960KB RISC microprocessor which, through convention, communicates with external devices through 16-bit wide shared RAM data access. Resolution of 16-bit accesses to internal 32-bit format of printer microprocessor 151 is left to the printer microprocessor. However, resolution of 16-bit data accesses from microprocessor 151 to 8-bit wide shared SRAM 200 is left to SRAM interface 440 and the above-mentioned upper byte and lower byte buffers. That structure is described in more detail below.

More particularly, for address information latched in latch 722, multiplexer 735 transfers twelve of the thirteen bits onto internal address bus 736. The thirteenth bit, here A0, is provided from generator 747. Generator 747 is activated by lower strobe output 750 and upper strobe output 752, both from strobe generator 751. Strobe generator 751 is arranged so as to provide two consecutive signals, lower strobe 750 and upper strobe 752, in response to receipt of an FPACK access grant signal from shared memory arbiter 430. Lower strobe signal 750 is provided to generator 747 which, in turn, provides a binary zero bit for the thirteenth address bit to multiplexer 735. Multiplexer 735 selects these thirteen address bits onto internal address bus 736. The address information on internal address bus 736 is, as mentioned above, latched onto SRAM address bus 740 via buffer 737. Buffer 737 is activated by output of OR gate 739 which includes as its inputs upper strobe 752 and lower strobe 750. Thus, in response to each consecutive upper and lower strobe signal 750 and 752, OR gate 739 outputs a signal to buffer 737 which causes address information on internal address bus 736 to be transferred to SRAM address bus 740.

Upper address strobe 752 is also provided to generator 747 which generates a binary one bit for the thirteenth address bit to multiplexer 735. Multiplexer 735 selects those thirteen bits onto internal address bus 736. That modified address information is, in sequence with receipt of upper strobe 752 by OR gate 739, transferred to address bus 740 of SRAM 200.

Handling of data information depends on whether a read or a write is requested by printer microprocessor 151. In the case of a write, strobe generator 751 provides lower strobe signal 750 to buffer 754 which buffers the lower byte of data information on printer A/D bus 701 to internal data bus 744. That data information is buffered to SRAM data bus 741 via bi-directional buffer 742 which is activated by output of OR gate 745 which, in turn, accepts as one of its inputs the printer access grant signal FPACK. Thus, the lower byte of data information on printer A/D bus 701 is transferred via buffer 754 onto internal data bus 744 and thence to SRAM data bus 741.

The upper byte of data information on printer A/D bus 701 is buffered by buffer 755 which is activated by upper strobe signal 752 from strobe generator 751. As before, that upper byte of data information is transferred onto internal data bus 744 and thence to SRAM data bus 741 via bi-directional buffer 742.

When printer microprocessor 151 requests a read of SRAM data, lower strobe signal 750 and upper strobe signal 752 are delayed by respective delays 756 and 757 and the delayed strobes control respective latches 758 and 759. Those latches latch respective lower and upper bytes provided from data bus 741 of SRAM 200, assemble the upper and lower bytes onto printer A/D bus 701, and provide the assembled data information to printer microprocessor 151.

Thus, in summary, when printer microprocessor 151 is granted access to shared SRAM 200, address information latched in latch 722 is provided to the address bus of SRAM 200, and data information written to (or read from) SRAM 200 is resolved by lower and upper buffers 754 and 755 into data information for SRAM data bus 741 (or assembled from data information from data bus 741 by latches 758 and 759). When access by printer microprocessor 151 is complete, any held off access requests from the NEB are then processed.

OR gate 760 outputs a chip select signal 761 to shared SRAM 200. Inputs to OR gate 760 are lower address strobe 750, upper address strobe 752 and NEB access grant signal NACK. Thus, in response to any of those signals, chip select signal 761 is issued.

FIG. 17 is a timing diagram showing timing of signals provided to arbiter control logic 400. Specifically, on the printer side and as discussed above, arbiter control logic 400 is provided with printer clock 705, printer ALE signal 702, printer A/D bus 701, printer DEN signal 704 and printer ready signal 706. In response to address information on printer A/D bus 701 which corresponds to address space in shared SRAM 200, which is valid and latched when printer ALE signal 702 goes high, and which thereafter generates a printer request signal 726 (FIG. 15) when printer DEN signal 704 goes low, hold off circuit 730 in arbiter control logic 400 generates a printer ready signal 706 to cause printer microprocessor 151 to generate wait states until access to SRAM 200 has been granted and valid data appears on printer A/D bus 701, as indicated when printer DEN signal 704 goes high.

On the NEB side, in response to address information on NEB A/D bus 711 which corresponds to address space in SRAM 200, which is valid and latched when NEB ALE signal 712 goes low, and which thereafter generates a NEB request signal 721 when NEB write signal 714 (not shown) goes low, a NEB ready signal 716 is generated until access to SRAM 200 is granted and valid data appears on NEB A/D bus 711.

[Reducing Bus Contention In Shared Memory]

As discussed above, arbiter control logic 400 is integral to the design of NEB 101, in that it allows only one of the processors to access shared SRAM 200 at a given point in time. This prevents simultaneous access to the same memory cell, thereby preventing data corruption. However, the arbitration, by necessity, is performed on the entire memory array, and not on individual memory cells. Thus, one processor must wait while the other accesses the memory, even if the two referenced addresses are different with respect to one another. This can lead to very slow memory access times, particularly in the case where print data is being transferred from the network by NEB microprocessor 173 to printer interface microprocessor 151 via shared SRAM 200.

Figure 18:
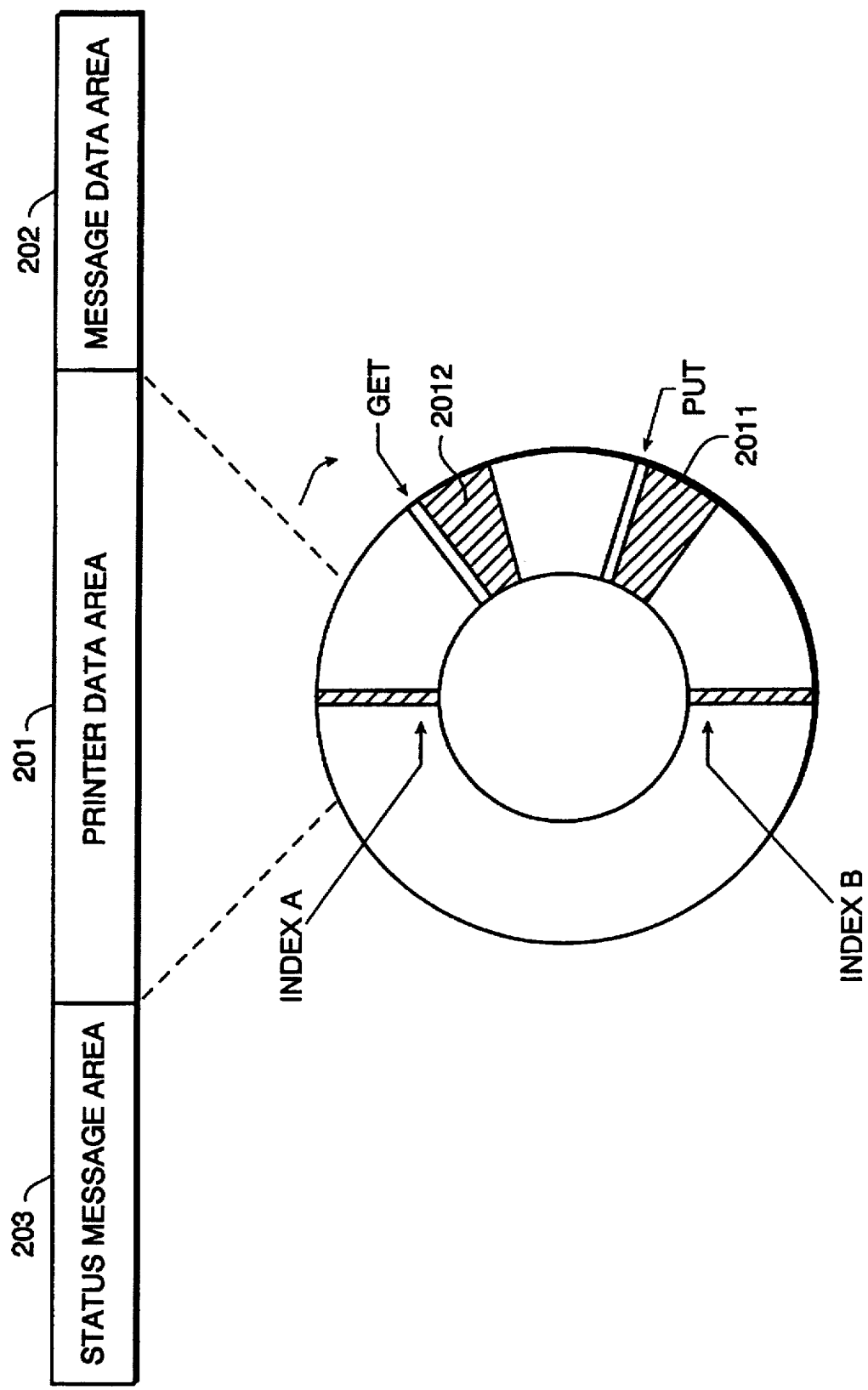
FIG. 18 is a diagram showing the configuration of shared memory.

FIG. 18 shows how available memory in SRAM 200 is divided in logical space. All data transferred from NEB 101 to printer 102, including print job data, commands and status requests, are written by NEB microprocessor 173 into printer data area 201, from where the data are read by printer interface microprocessor 151. Conversely, all data transferred from printer 102 to NEB 101 are written by printer interface microprocessor 151 into message data area 202, from where the data are read by NEB microprocessor 173.

As is shown in FIG. 18, printer data area 201 is configured as a ring buffer, in which a linear memory array is addressed circularly so that addressing automatically restarts at the beginning when the end is reached. Such a memory structure requires two pointers: a "put" pointer which marks the next address in which data are to be written, and a "get" pointer marking the next address from which data are to be read. The values of these pointers are stored in SRAM 200 itself, in status message area 203. The sending processor controls the value of the put pointer, advancing it as it writes new data into the ring buffer, while the receiving processor controls the value of the get pointer, advancing it as it copies data out.

Data are written into the ring buffer in blocks of 256 bytes, with the put and get pointers marking where the next block begins. For example, in FIG. 18, the put pointer points to block 2011, indicating that that block is the next available space in memory in which NEB microprocessor 173 is to write, while the get pointer points to block 2012, indicating that that block is the next space in memory from which printer interface microprocessor 151 is to read. Before writing a block of data into memory, NEB microprocessor 173 reads the values of the put and get pointers from status message area 203, and compares them to determine whether there is available room in the ring. Similarly, printer interface microprocessor 151 reads the values of the put and get pointers from status message area 203 and compares them to determine whether there is data to be read.

Thus, in transferring data from one processor to another using a ring buffer, the receiving processor follows the sending processor "around the ring", reading out the data that has been written. Because the receiving processor is limited by the speed of the printer it is driving, however, the sending processor generally writes data in faster than the receiving processor can read it out, and it is likely that, in a conventional system, the put pointer will loop around the ring and "catch up" with the get pointer that is behind it. In such a case, the sending processor simply waits until memory space becomes available in the ring. During that waiting time, in conventional systems the sending processor reads and compares the put and get pointers periodically to determine if space has become available. Such polling by the sending processor slows down the receiving processor, since the sending processor must access the shared memory to read the values of the pointers, which prevents access by the printer and degrades the performance of the entire system.

In NEB 101, bus contention is reduced by preventing the put pointer from being ahead of the get pointer by more than a predetermined amount and then waiting until the get pointer catches up. The NEB does not poll shared SRAM 200 to determine when the get pointer catches up with the put pointer, but rather relies on another device, here interrupt control register 450, to provide notification of when the get pointer catches up. Specifically, it is a feature of the printer interface that the print data can contain a command for the printer to generate an acknowledgement to the NEB via interrupt control register 450. The NEB inserts this command in the last block of print data that it sends to the printer, and uses the acknowledgement from interrupt control register 450 as a substitute for polling. Specifically, the NEB sends print data to the printer by (1) determining whether there is available space in shared RAM for the print data by reference to a counter of outstanding acknowledgements, (2) if there is available space, reading the get and put pointers and determining whether the put pointer is equal to one of plural partition indices which correspond to the number of partitions into which the ring buffer is divided, (3) writing a command requesting the receiving processor (the printer) to issue an acknowledgement in the case where the value of the put pointer is equal to one of the predetermined indices, (4) writing a block of print data into the shared memory at the location of the put pointer, and thereafter, (5) updating the value of the put pointer. When NEB 101 writes a command requesting the printer to issue an acknowledgement, it updates the number of outstanding acknowledgements that it expects to receive from the printer by adding one to the counter of outstanding acknowledgements. When an acknowledgement is received from the printer, the counter of outstanding acknowledgements is reduced by one. The counter is not stored in shared SRAM 200, but rather is stored in DRAM 175 which is owned by NEB microprocessor 173 and for which there is no problem of bus contention. Accordingly, NEB 101 determines whether there is space available in the ring buffer by comparing the number of outstanding acknowledgements stored in the counter to the number of partitions into which the ring buffer is divided. If the number of outstanding acknowledgements is greater than or equal to the number of partitions, then the ring buffer is full and NEB 101 does not write any additional print information to the ring buffer; instead, it waits until an acknowledgement is received which indicates that the printer has cleared out one partition of the ring buffer and that that partition is now available for new print information. On the other hand, if the number of outstanding acknowledgements is less than the number of partitions, then there is still available space in the ring buffer.

Figure 19:
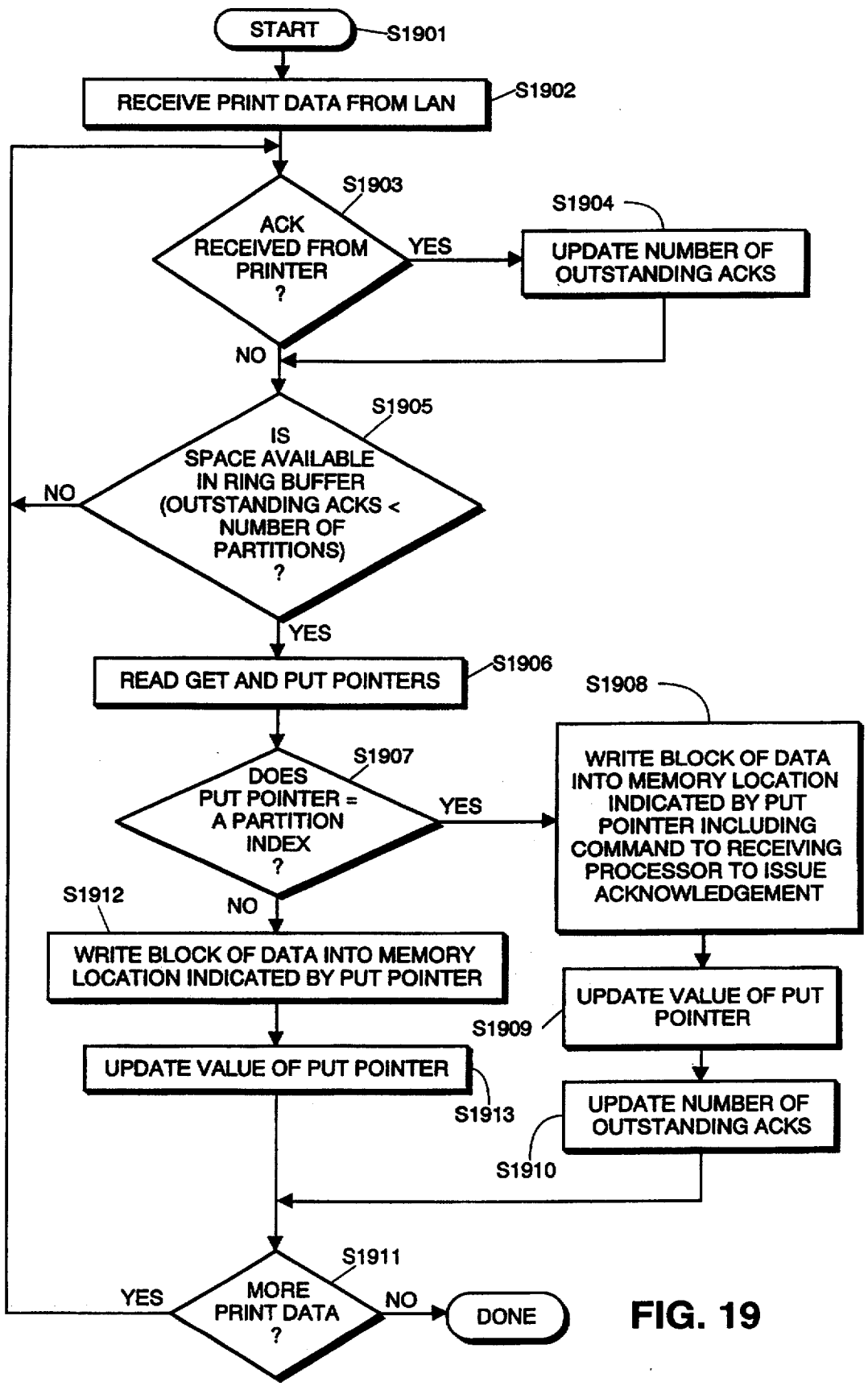
FIG. 19 is a flowchart showing the operations involved in writing into shared memory.

FIG. 19 shows the procedure by which the sending processor on NEB 101 (i.e., NEB microprocessor 173) writes data into shared SRAM 200. The process begins when a print job is received from the LAN (step S1902). When the print job is received, NEB microprocessor 173 determines whether there is space available in the ring buffer for print data. This is accomplished by counting the number of outstanding acknowledgements which are expected from the printer. More specifically, as mentioned above, it is possible for NEB microprocessor 173 to insert commands mixed with the print data which cause the printer to issue an acknowledgement which is conveyed from the printer to NEB microprocessor 173 via interrupt control register 450. NEB microprocessor 173 tracks the number of outstanding acknowledgements, that is, the number of commands issued for an acknowledgement minus the number of acknowledgements actually received. If the number of outstanding acknowledgements is less than the number of partitions into which the ring buffer has been divided (here, the ring buffer has been divided into two partitions), then space is available in the ring buffer for more print data; on the other hand, if the number of outstanding acknowledgements is equal to or greater than the number of partitions into which the ring buffer has been divided, then no more space is available and NEB microprocessor 173 waits until acknowledgements have been received.

Thus, in step S1903, NEB microprocessor 173 determines whether an acknowledgement has been received from the printer. If an acknowledgment has been received, flow branches to step S1904 in which the number of outstanding acknowledgements is updated. In any event, flow then advances to step S1905 in which NEB microprocessor 173 determines whether space is available in the ring buffer for the print data received in step S1902. As mentioned above, NEB microprocessor 173 does not determine whether space is available by accessing the put and get pointers, since such accesses would cause needless bus contention. Instead, NEB microprocessor 173 determines whether there is space available by comparing the number of outstanding acknowledgements to the number of partitions into which the ring buffer has been divided. If the number of outstanding acknowledgements is not less than the number of partitions, then no space is available in the ring buffer and flow returns to step S1903 until an additional acknowledgement is received. On the other hand, if the number of outstanding acknowledgements is less than the number of partitions, then space is available in the ring buffer and flow advances to step S1906.

In step S1906, the put and get pointers are read from shared SRAM 200 from status message area 203. In step S1907, if the put pointer equals a partitioned index, that is, if the put pointer points to the end of a partition in the ring buffer, such as index A and index B in FIG. 18, then NEB microprocessor 173 inserts a command for the printer to issue an acknowledgement. More specifically, if the put pointer is equal to one of the partitioned indices, then flow branches to step S1908 in which the NEB microprocessor writes its next block of print data into the memory location indicated by the put pointer, but also includes in the block a command for the receiving processor (i.e., printer microprocessor 151) to issue an acknowledgement. NEB microprocessor 173 next updates the value of the put pointer (step S1909), and then updates the number of outstanding acknowledgements (step S1910). Flow then advances to step S1911 in which it is determined whether more print data needs to be sent to the printer. If more data needs to be sent, then flow returns to step S1903 in which NEB microprocessor 173 determines whether space is available in the ring buffer by reference to the number of outstanding acknowledgements.

On the other hand, if in step S1907 the put pointer is not equal to one of the partitioned indices, then flow continues at step S1912 in which NEB microprocessor 173 simply writes its next block of print data into the memory location indicated by the put pointer, updates the value of the put pointer (step S1913) and continues on to step S1911 to determine whether more print data needs to be sent to the printer.

Figure 20:
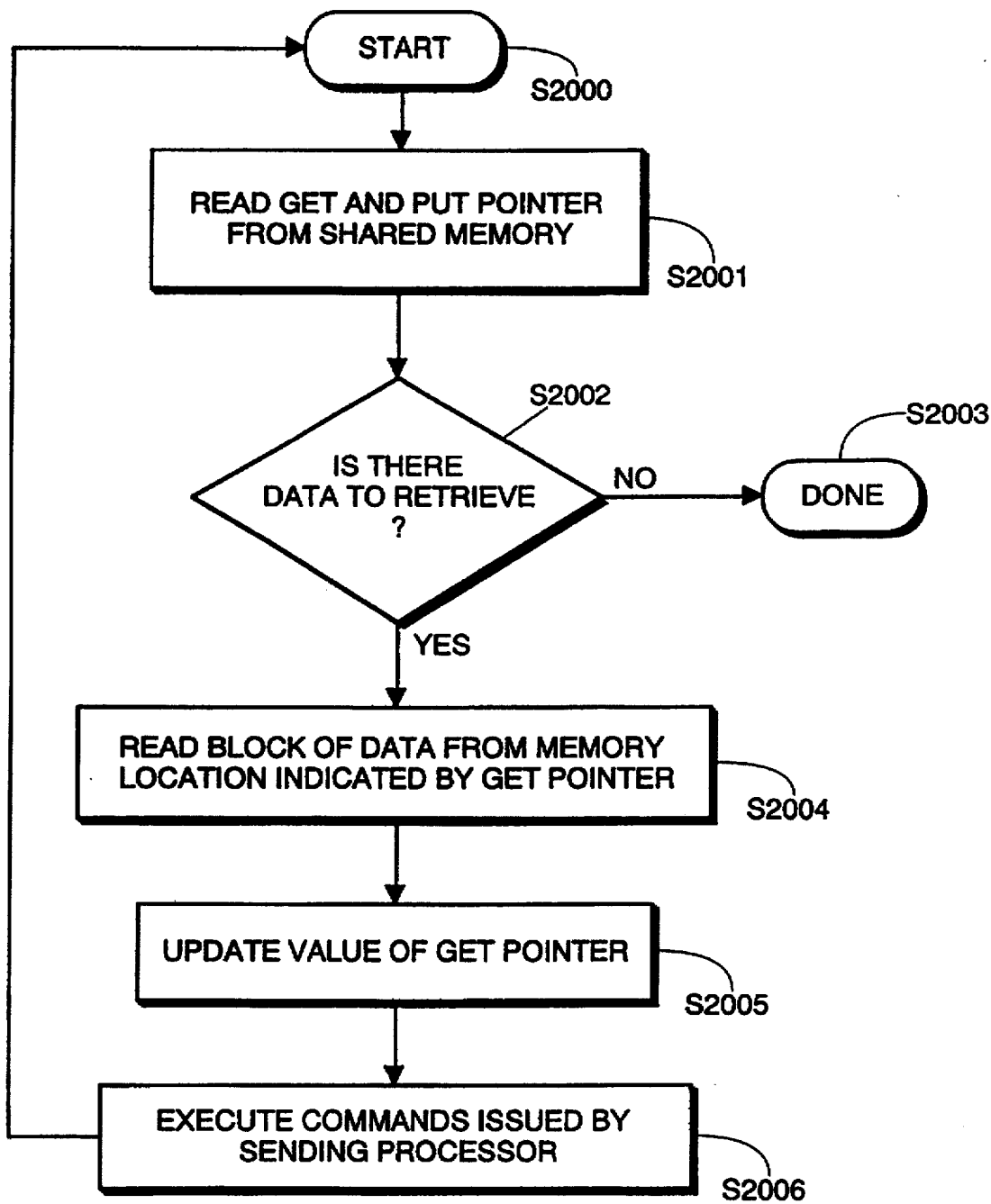
FIG. 20 is a flowchart showing operations involved in reading from shared memory.

The receiving processor issues acknowledgements when it reads from the shared memory the data block that includes that command. More particularly, and referring to FIG. 20, the receiving processor begins its data retrieval by reading the values of the get and put pointer from the shared memory (step S2001). If there is data to retrieve (step S2002), the receiving processor reads the block of data from the memory location indicated by the get pointer (steps S2002–S2004) and updates the value of the get pointer (step S2005).

The receiving processor then executes any commands that were included in the data block (step S2006), such as, for example, a command to issue an acknowledgement. The receiving processor issues this acknowledgement as an interrupt to the sending processor, which it generates by writing a bit to interrupt control register 450 that is part of arbiter control logic 400. When the sending processor receives the interrupt, it updates its number of outstanding acknowledgements, as described above.

Figure 21A:
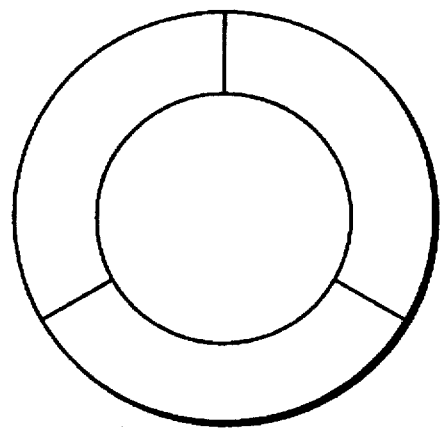
FIGS. 21(a) through 21(c) show various alternatives for configuring shared memory.
Figure 21B:
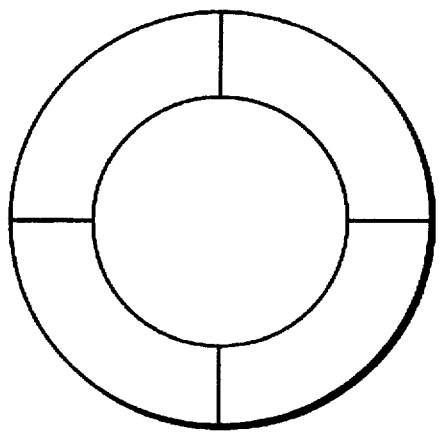
Figure 21C:
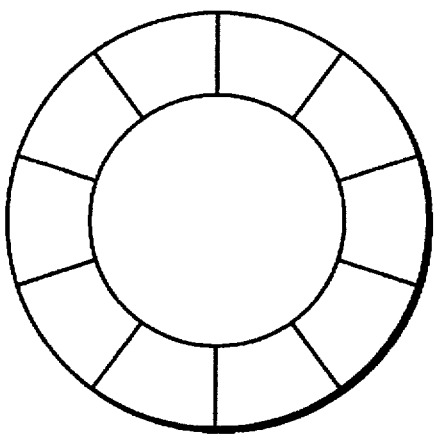

Accordingly, when the ring buffer is partitioned into two partitions, the sending processor writes blocks to only half of the ring buffer at a time, checks if the receiving processor has finished reading the other half, and ceases to access the shared memory at each of the indices until the receiving processor catches up. In alternative embodiments, the ring can be further divided into finer granularities in those situations where two ring segments are insufficient. In those cases, as shown in FIGS. 21(a) through 21(c), for example, additional indices would be used.

By virtue of this structure, the waiting of NEB microprocessor 173 will not hinder the reading of printer interface microprocessor 151, since NEB microprocessor 173 will not be accessing the shared SRAM 200 at all at that time. This not only achieves a greater data throughput, since the printer interface microprocessor 151 can accomplish its task more quickly, but also frees NEB microprocessor 173 from having to poll the put and get pointers, allowing it to perform other work not involving shared SRAM 200.

[Serial Port]

Serial port connector 600, as mentioned above, is provided for serial communications with external processors, particularly a processor used in connection with debug services for NEB 101. Specifically, via serial port connector 600, an external processor is able to retrieve debug information transmitted by NEB 101 when NEB 101 is set to a debug state. That information can include, for example, status of internal NEB registers, status of network broadcasts and traffic on network interface 301 (or 302, whichever is enabled), status of print information as well as print information being written to shared SRAM 200 and the like.

Because serial port connector 600 is used in connection with debug services, it is imperative that serial communications over that port are responded to by NEB microprocessor 173, regardless of the interruptability of NEB microprocessor 173. For example, when reducing bus contention by waiting to write new print data into SRAM 200 until printer 102 issues an acknowledgement, as described above, it is possible for the printer erroneously to fail to issue such an acknowledgment. In those cases, the NEB microprocessor will loop continuously until an acknowledgement is received. Ordinarily, a processor in such a state is "locked-up" meaning that it does not respond to any interrupts; in this locked-up state it is ordinarily necessary to cycle power to the board. However, because this erroneous operation is precisely the kind of operation for which debug information is desired over serial port connector 600, it is imperative that NEB microprocessor 173 be able to respond to such serial communications.

The arrangement illustrated in the accompanying figures describes a serial port construction in which signals on a receive channel are transmitted to the non-maskable interrupt (NMI) pin of NEB microprocessor 173. A non-maskable interrupt feature is available on most modern-day processors, such as the Intel 80X86 line of processors, and it provides a means for interrupting the processor regardless of its current computing state. That is, when the NMI pin is activated, the processor must respond to the interrupt regardless of other operations that are currently underway.

Figure 22:
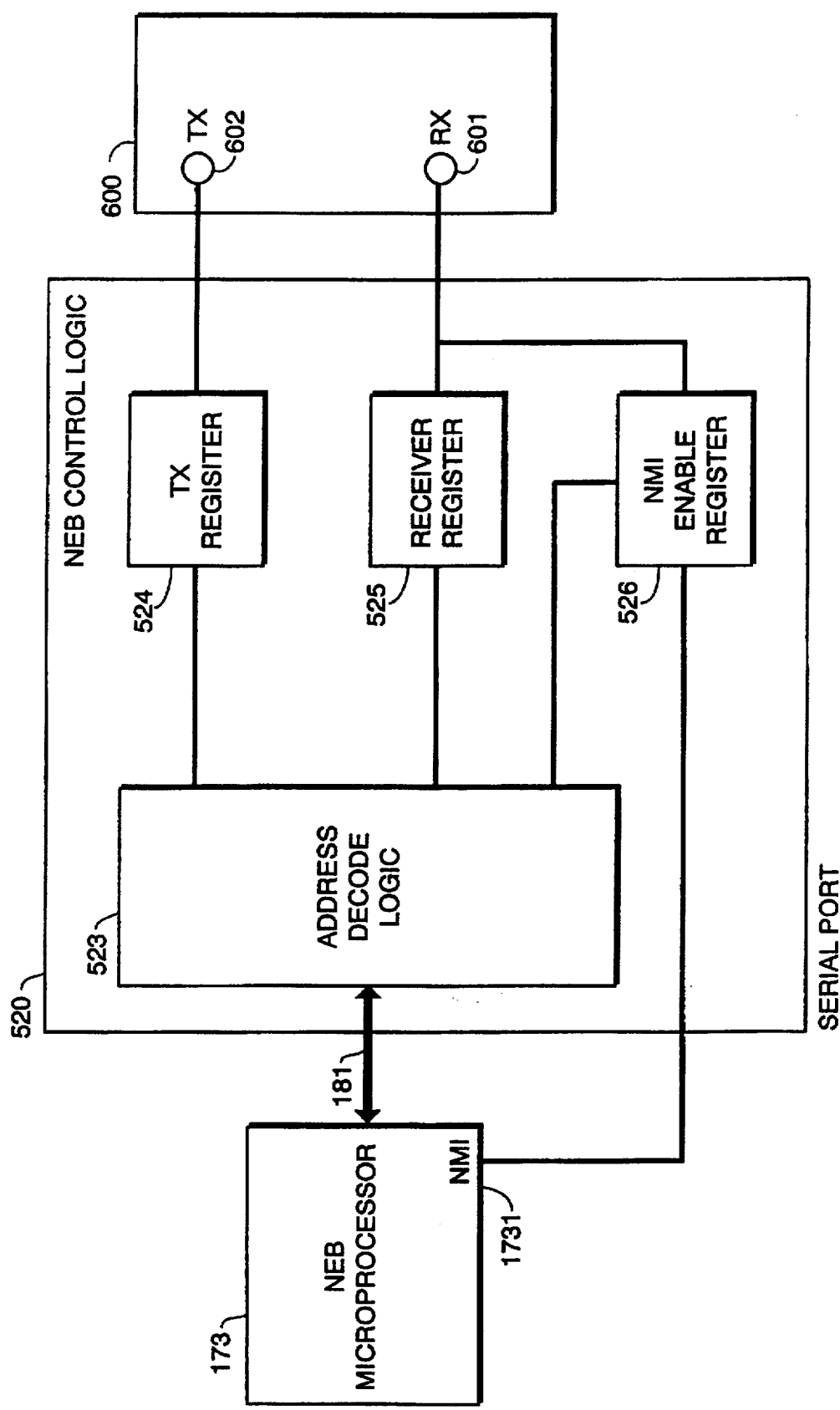
FIG. 22 is a block diagram of a serial port.

More particularly, as shown in FIG. 22, a serial port construction according to the invention includes NEB microprocessor 173 which includes a non-maskable interrupt (NMI) pin 1731 and which is connected via bus 181 to NEB control logic 520, as described above. NEB control logic 520 includes address decode logic 523 which decodes address signals on bus 181 and which provides access to internal registers in NEB control logic 520. Particularly, three registers are concerned here: transmit register 524, receive register 525, and NMI enable register 526.

Transmit register 524 includes a transmit bit which is connected to transmit pin 602 of the serial port. Specifically, the transmit bit is writable by NEB microprocessor 173 via bus 181 and address decode logic 523, and in accordance with a binary 1 or 0 state of that transmit bit a corresponding +5 or 0 volt voltage level appears at transmit terminal 602.

Receive register 525 includes a receive bit which is connected to receive pin 601 of the software serial port. More specifically, in accordance with a voltage level which appears at receive terminal 601, the receive bit is set to a binary 0 or 1, and the receive bit may be read by microprocessor 173 via bus 181 and address decode logic 523.

NMI enable register 526 is a switch controllable by microprocessor 173 and which is connected between receive terminal 601 and NMI pin 1731. Under control of microprocessor 173 and via bus 181 and address decode logic 523, NMI enable register 526 is switchable between an enable state in which signals appearing at receive terminal 601 are connected to NMI pin 1731, and a disable state in which signals appearing at receive terminal 601 are blocked.

Transmit register 524, receive register 25, and NMI register 526 can physically be constructed from a single register, but more typically each are provided in a separately addressable register, as shown in FIG. 22.

Figure 23A:
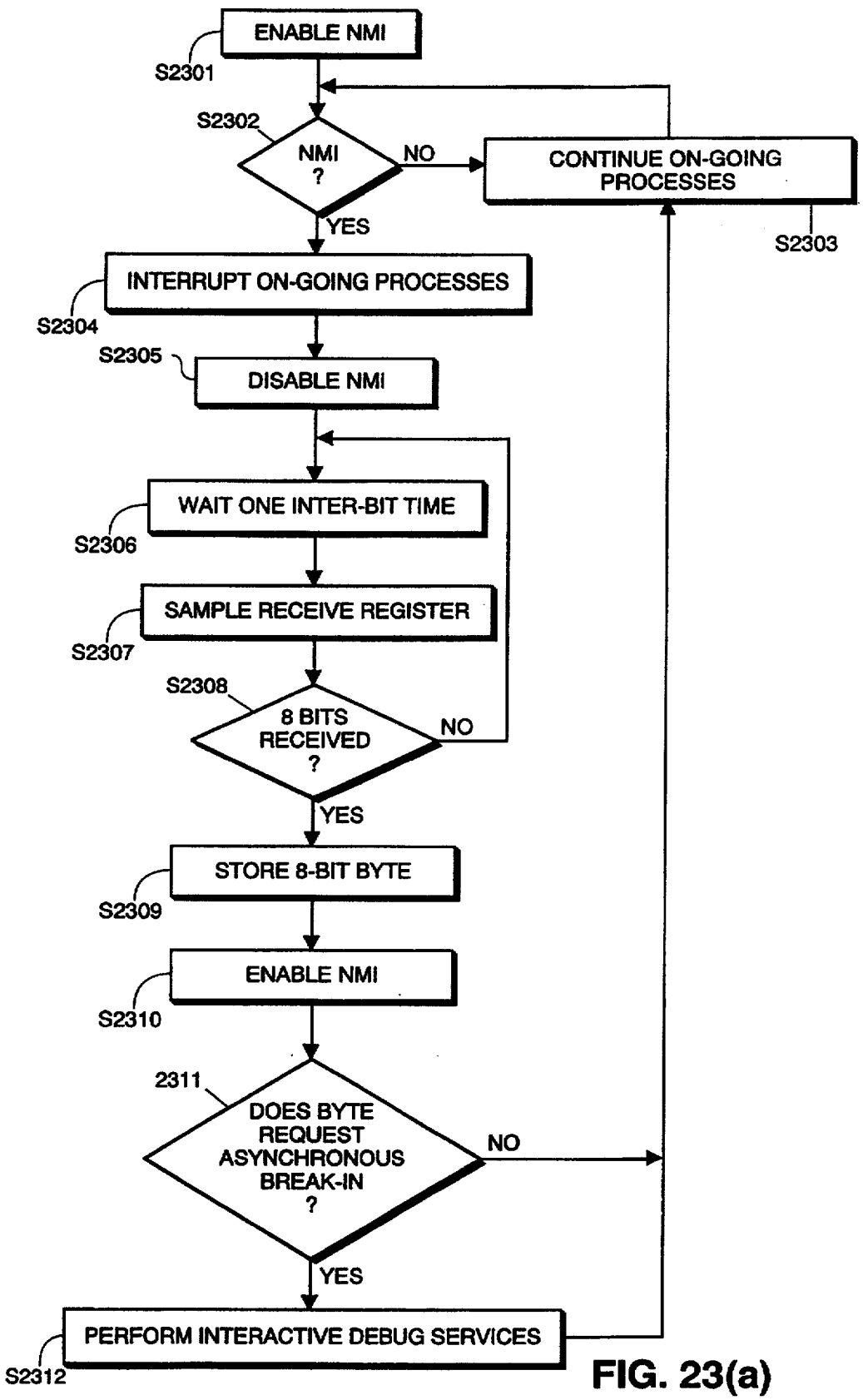
FIGS. 23(a) and 24(a) are flowcharts showing operations involved in receiving and sending serial communications over the serial port.

FIG. 23(a) shows serial port processing in a serial receive mode. The process steps illustrated in FIG. 23(a) are executed by NEB microprocessor 173 in accordance with software instructions stored in DRAM 175.

In step S2301, microprocessor 173 enables NMI enable register 526 so as to permit transmission of signals appearing at receive terminal 601 directly to NMI pin 1731. Then in step S2302, microprocessor 173 monitors its NMI pin 1731 for the appearance of an NMI signal. If no non-maskable interrupt has been received, microprocessor 173 continues with ongoing processing (step S2303), such as continuing with networked printing operations between the computerized LAN 100 and the printer.

Figure 23B:
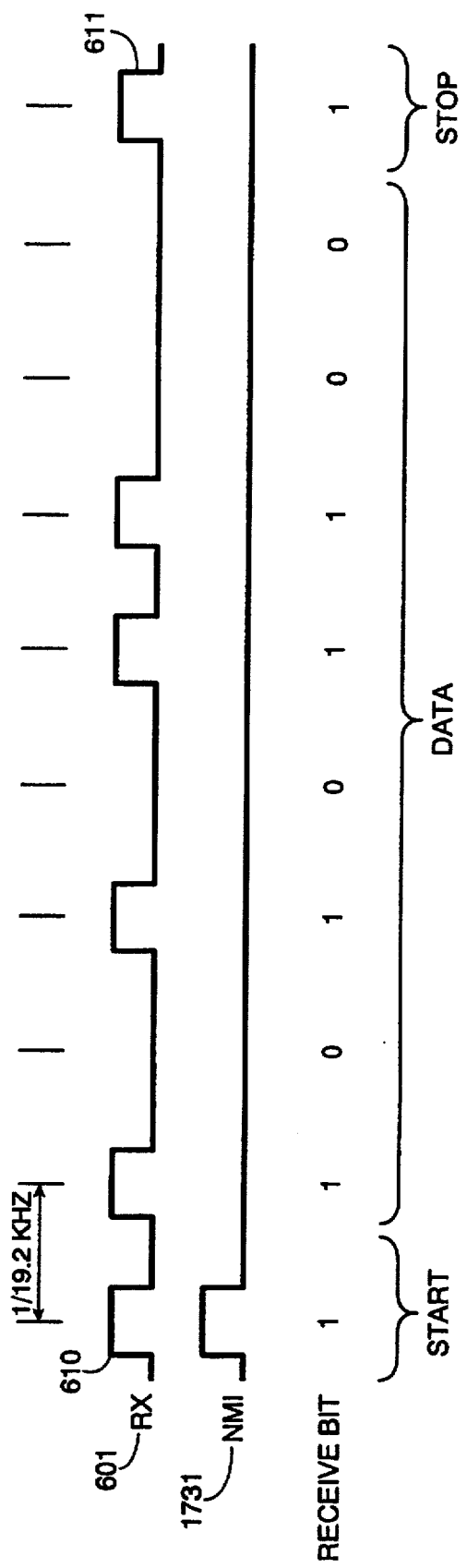
FIGS. 23(b) and 24(b) are diagrams showing the timing of signals in the serial receive and send modes.

On the other hand, when an NMI signal is received at NMI pin 1731, flow advances to step S2304 in which microprocessor 173 interrupts on-going processes. As seen in FIG. 23(b), because NMI enable register has been enabled, an NMI signal will be received in correspondence to a start bit at receive terminal 601. FIG. 23(b) illustrates timing of signals in a serial receive mode. Thus, as seen in FIG. 23(b), when a voltage level 610 corresponding to a start bit appears at receive terminal 601, because of the enable state of NMI enable register 526, that start bit is transmitted to NMI pin 1731. At the same time, because of voltage level 610 associated with the start bit, the receive bit in receive register 525 switches to a binary 1.

Reverting to FIG. 23(a), after microprocessor 173 interrupts on-going processes (step S2304), the microprocessor begins execution of an NMI interrupt handling procedure which, in step S2305, disables NMI enable register 526 so as to block transmission of other signals from receive terminal 601 to NMI pin 1731. The interrupt handling procedure then waits for a serial transmission period so as to allow the first data bit to appear at receive terminal 601. In situations where serial transmission is conducted at 19.2 KHz, the predetermined serial transmission period is 1/19.2 KHz or 52 µs. After the predetermined serial transmission period is over, flow advances to step S2307 in which the received bit in receive register 525 is read. This is shown in FIG. 23(b) in which, for illustrative purposes, the first data bit is a binary 1 corresponding to a high voltage level at receive terminal 601. The received bit is retrieved from receive register 525 and steps S2306 and S2307 are repeated (step S2308) until eight data bits have been received. Any stop bits (such as 611 in FIG. 23(b)) that are transmitted are simply ignored.

When eight data bits have been received, flow then advances to step S2309 in which the interrupt handling procedure stores an 8-bit byte of data which has been received at the receive terminal 601. In step S2310, microprocessor 173 enables the NMI enable register 526 so as to be prepared for receipt of a next serial transmission. The serial communication cycle for receiving one byte of serial data is then complete.

In step S2311, microprocessor 173 determines whether the 8-bit byte stored in step S2309 requests an asynchronous break-in to ongoing software tasks. More specifically, once the NMI interrupt handling procedure described above has terminated, flow ordinarily returns to ongoing processes such as CPSOCKET and the like, all under control of the MONITOR. One benefit of an NMI-driven serial port, however, is the ability to break into a running program in the midst of a problem. For example, in situations where the NEB has crashed due to unexpected software problems, the state of the NEB is often unknown. It might be in a very tight microprocessor loop that has no debug messages being transmitted. Resetting the NEB, which is often the only way to break the microprocessor loop, will lose the current state and will provide no information as to the cause of the crash. In such a situation, the ability to break in via the NMI-driven serial port and examine the system is extremely valuable.

Accordingly, step S2311 determines whether the byte received on the serial port connector requests asynchronous break-in. For example, by previously-arranged convention, it might be determined that transmission of an exclamation point ("!") signifies a request for asynchronous break-in. In those instances, microprocessor 173 continues to suspend ongoing processes, and enters an interactive debugger. The interactive debugger is a ROM-resident program that allows a user to view or to change memory addresses, CPU registers and I/O ports. Additionally, the interactive debugger allows two set break points in the code and has the ability to start execution from any such break point. This is all accomplished across serial port connector 600.

Thus, asynchronous break-in permits a trouble-shooter to analyze the current state of NEB when a problem has been encountered. Since the start bit on a serial communication causes an NMI signal to be generated, asynchronous break-in allows to begin an interactive debug session in which even a tightly-bound microprocessor loop may be interrupted so as to permit analysis of the system state.

On the other hand, if the 8-bit byte stored in step S2309 does not request asynchronous break-in, then microprocessor 173 simply stores the received byte and returns to step S2303 in which it resumes execution of ongoing processes that had been suspended in step S2304. Typically, other software modules active on microprocessor 173, such as CPSOCKET, monitor the data buffer into which the 8-bit byte has been stored. For example, by a previously-arranged convention, it might be determined that transmission of the character sequence "DNLD" signifies a request for download services in which a new software module or modules are downloaded over the serial port connector 600. In such an instance, CPSOCKET might be arranged so as to echo each of the "DNLD" characters as they are received and thereafter to enter a download mode.

Figure 24A:
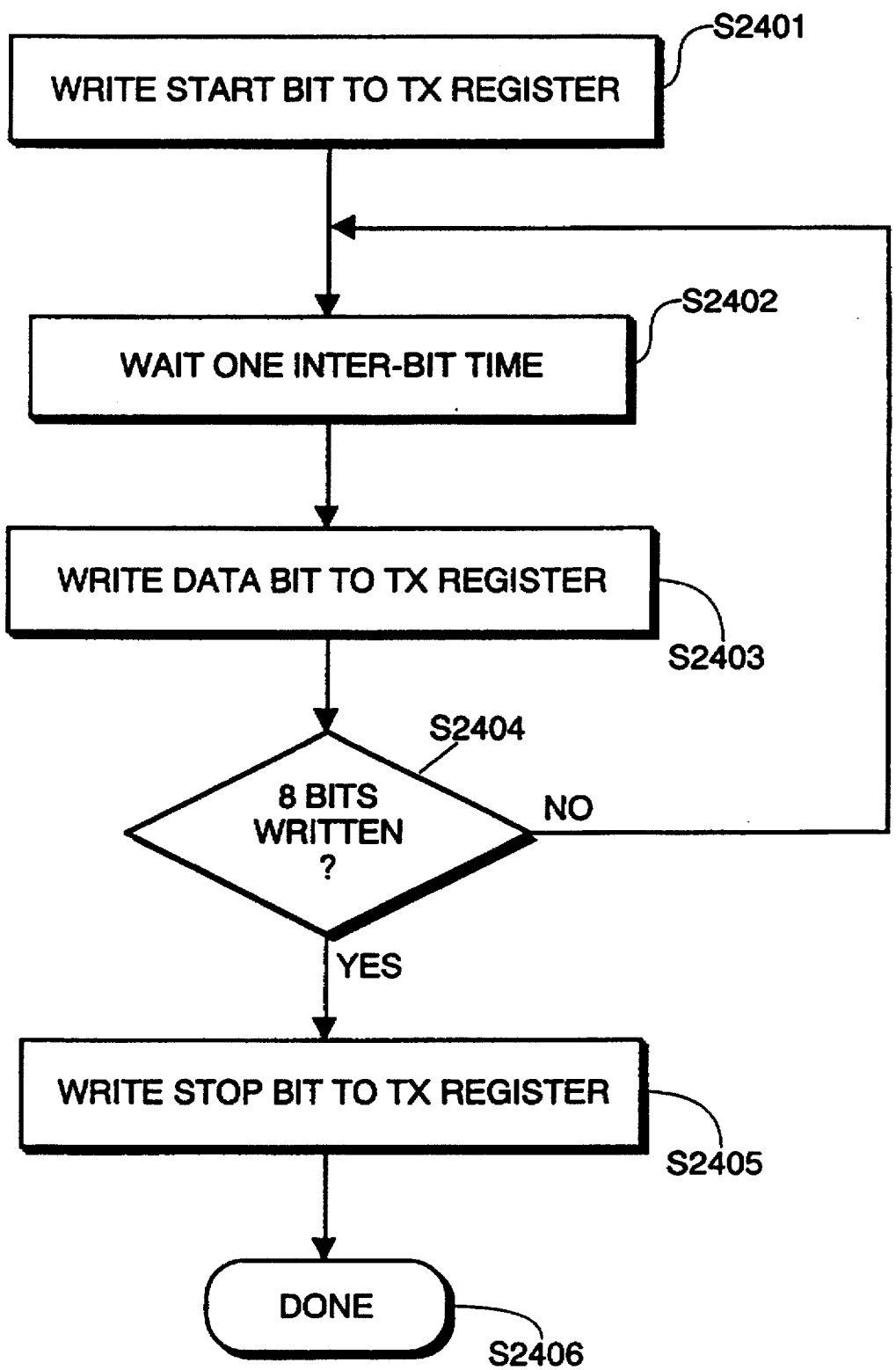
Figure 24B:
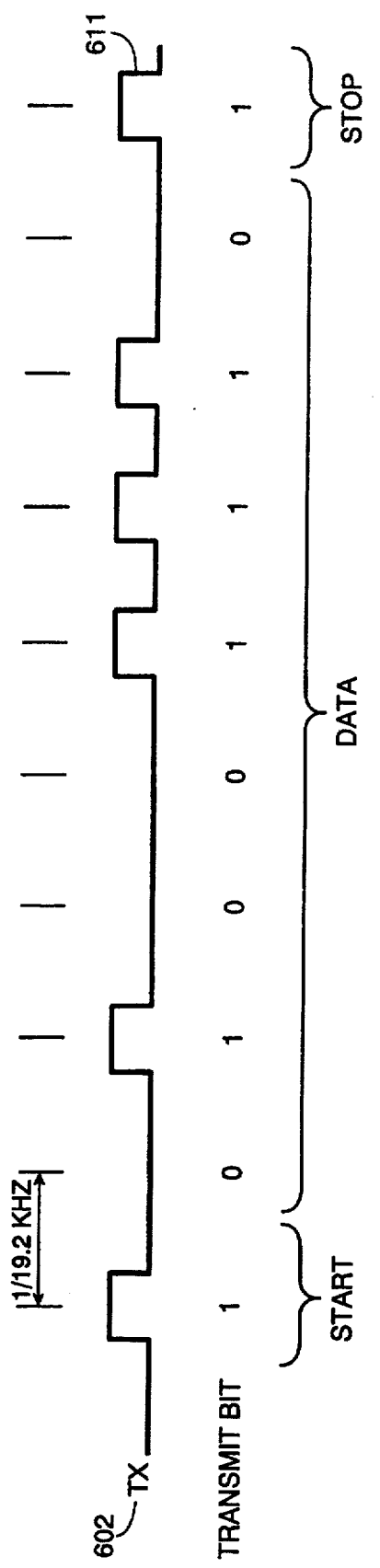

FIG. 24(a) shows flow processing in the transmit mode of the software serial port, and FIG. 24(b) shows signals appearing at transmit terminal 602 in connection with transmit bits written into transmit register 524.

In step S2401, microprocessor 173 writes a binary 1 start bit to the transmit bit in transmit register 524. The transmit bit, since it is connected to transmit terminal 602, causes a +5 voltage level to appear at transmit terminal 602.

Flow then advances to step S2402 in which NEB microprocessor 173 waits a predetermined serial transmission period which, at a serial rate of 19.2 KHz corresponds to 1/19.2=52 µs (one inter-bit time). After waiting the required period, microprocessor 173 writes the first bit in the transmitted word to the transmit bit in transmit register 524 (step S2403). Until all eight bits of the transmitted word have been written (step S2404), microprocessor 173 repeats steps S2402 and S2403 in which it waits for the serial transmission period and writes a next data bit to the transmit bit in transmit register 524. After all eight bits have been written, flow advances to step S2405 which, after waiting for the inter-bit transmission period, writes a stop bit to register 524, and then to step S2406 at which point serial transmission is complete.

The invention has been described with respect to a particular illustrative embodiment. It is to be understood that the invention is not limited to the above described embodiment and that various changes and modifications may be made by those of ordinary skill in the art without departing from the spirit and scope of the invention.

What is claimed is:

1. A network communication device having plural different connectors, each connectable to a network, said device being capable of automatically selecting one of said different connectors for network communication, comprising:

a selector responsive to a selection signal which selects one of the plural different connectors in accordance with the selection signal;

a plurality of detectors, each detector associated with a corresponding connector, and each of which detects whether the corresponding connector is connected to the network before the network communication device effects network communication over the corresponding connector;

a processor which executes a selection process by outputting a selection signal so as to select, in turn, each of the plural different connectors starting with a first connector, maintaining a state of the selection signal in a case where the detector associated with the selected connector indicates connection to the network, cycling to a next connector in a case where the detector does not indicate connection to the network, and repeating the selection process in a case where said processor has cycled through all of said plural different connectors until it is determined that one of the plural connectors is connected to the network.

2. A network communication device according to claim 1, wherein the processor effects network communication over a selected connector after the processor determines which connector is connected to the network.

3. A network communication device according to claim 1, wherein said plural different connectors comprise at least an RJ-45 connector capable of accepting a 10Base-T connection and a BNC connector capable of accepting a 10Base-2 connection.

4. A network communication device according to claim 3, wherein said plurality of different detectors comprise at least a first detector for detecting whether the RJ-45 connector is connected to the network and a second detector for detecting whether the BNC connector is connected to the network.

5. A network communication device according to claim 4, wherein said first detector detects whether there is an electrical current at the RJ-45 connector.

6. A network communication device according to claim 5, further comprising a first detection register which is set to a first state in a case where said first detector detects an electrical current at the RJ-45 connector and to a second state in a case where said first detector does not detect an electrical current at the RJ-45 connector.

7. A network communication device according to claim 4, wherein said second detector detects whether the BNC connector is improperly terminated.

8. A network communication device according to claim 7, further comprising a second detection register which is set to a first state in a case where said second detector detects that the BNC connector is not improperly terminated and to a second state in a case where said second detector detects that the BNC connector is improperly terminated.

9. A network communication device according to claim 4, further comprising:
- a first detection register which is set to a first state in a case where said first detector detects that the RJ-45 connector is connected to the network and to a second state in a case where said first detector detects that the RJ-45 connector is not connected to the network; and
- a second detection register which is set to a first state in a case where said second detector detects that the BNC connector is connected to the network and to a second state in a case where said second detector detects that the BNC connector is not connected to the network.

10. A network communication device according to claim 9, wherein said processor executes the selection process by outputting a selection signal so as to select the RJ-45 connector, reading said first detection register, maintaining the state of the selection signal in a case where said first detection register is in the first state, outputting a selection signal so as to select the BNC connector in a case where said first detection register is in the second state, reading said second detection register, maintaining the state of the selection signal in a case where said second detection register is in the first state and repeating the selection process in a case where the second detection register is in the second state.

11. A network communication device according to claim 10, wherein network communications are transferred between said processor and the selected connector.

12. A method for automatically selecting which connector among plural different connectors on a network communication device is connected to a network, comprising the steps of:
- outputting a selection signal so as to select, in turn, each of the plural different connectors starting with a first connector;
- detecting whether each of the plural different connectors is connected to the network using plural detectors, each of the plural detectors corresponding to a respective one of the plural different connectors and detecting whether the respective one of the plural different connectors is connected to the network before the network communication device effects network communication over the respective one of the plural different connectors;
- maintaining the state of the selection signal in a case where the detecting step determines that the selected connector is connected to the network;
- cycling to a next connector in a case where the detecting step determines that the selected connector is not connected to the network; and
- repeating said outputting, detecting, maintaining and cycling steps in a case where said cycling step has cycled through all of said plural different connectors until it is determined that one of the plural connectors is connected to the network.

13. A method according to claim 11, further comprising the step of effecting network communication over a selected connector after it is determined which connector is connected to the network.

14. A method according to claim 12, wherein said plural different connectors comprise at least an RJ-45 connector capable of accepting a 10Base-T connection and a BNC connector capable of accepting a 10Base-2 connection.

15. A method according to claim 14, further comprising the steps of:
- determining whether the RJ-45 connector is connected to the network by determining whether there is an electrical current at the RJ-45 connector; and
- determining whether the BNC connector is connected to the network by determining whether the BNC connector is improperly terminated.

16. A method according to claim 15, further comprising the steps of:
- setting a first detection register to a first state in a case where the RJ-45 connector is connected to the network and to a second state in a case where said first detector detects that the RJ-45 connector is not connected to the network; and
- setting a second detection register to a first state in a case where said second detector detects that the BNC connector is connected to the network and to a second state in a case where said second detector detects that the BNC connector is not connected to the network.

17. A method according to claim 16, further comprising the step of:
- transferring network communications between the selected connector and a processor on the network communication device.

18. A network communication device having at least first and second connectors, each connectable to a network, comprising:
- a network controller connected to the first and second connectors and including a selector responsive to a selection signal for selecting between said first and second connectors, said network controller being connected to a bus, and transferring network communications between said bus and the selected one of said first and second connectors, said network controller also including a first detector for detecting whether said first connector is electrically connected to the network, a second detector for detecting whether the second connector is connected to the network and for outputting a jabber bit indicative of an improper connection of the second connector, the first and second detectors detecting connections of the first and second connectors, respectively, before the network communication device effects network communication over the first and second connectors, and a first register readable through the bus and in which said network controller stores the jabber bit output by said second detector;
- a second register readable through the bus for storing a good-link bit indicative of said first detector detecting that the first connector is electrically connected to the network;
- a control register writable through the bus for outputting a selection signal in accordance with a select bit stored therein; and
- a processor, connected to the bus, which sends and receives network communication over the bus, and which executes a selection process by (1) writing a select bit through the bus to the control register so as to cause output of a selection signal which selects the first connector, (2) reading the good-link bit through the bus from the second register, (3) maintaining the state of the selection bit in the case where the good-link bit indicates electrical connection to the network, (4) writing a select bit through the bus to the control register so as to cause output of a selection signal which selects the second connector in a case where the good-link bit does not indicate electrical connection to the network, (5) reading the jabber bit through the bus from the first register, (6) maintaining the state of the select bit in a case where the jabber bit does not indicate improper electrical termination of the second connector, and (7) repeating the selection process in a case where the jabber bit indicates improper electrical termination of the second connector and the good-link bit does not indicate good electrical connection, the repeating step repeating the selection process until it is determined that one of the connectors is connected to the network.

19. A network communication device according to claim 1, wherein the processor effects network communication over a selected connector after the processor determines which connector is connected to the network.

20. A network communication device according to claim 18, wherein said first connector is an RJ-45 connector capable of accepting a 10Base-T connection and said second connector is a BNC connector capable of accepting a 10Base-2 connection.

21. A network communication device according to claim 20, wherein said processor, in executing the selection process, reads the good-link bit through the bus from the second register a predetermined plurality of times so as to cause a delay, and maintains the state of the selection bit in a case where the good-link bit indicates electrical connection to the network after any of the plurality of reads.

* * * * *